(12) United States Patent
Kras

(10) Patent No.: US 12,519,815 B2
(45) Date of Patent: Jan. 6, 2026

(54) DETERMINING TEMPLATE DIFFICULTY BASED ON SECURITY MATURITY

(71) Applicant: KnowBe4, Inc., Clearwater, FL (US)

(72) Inventor: Greg Kras, Dunedin, FL (US)

(73) Assignee: KnowBe4, Inc.

( * ) Notice: Subject to any disclaimer, the term of this patent is extended or adjusted under 35 U.S.C. 154(b) by 373 days.

(21) Appl. No.: 18/113,179

(22) Filed: Feb. 23, 2023

(65) Prior Publication Data

US 2023/0308471 A1 Sep. 28, 2023

Related U.S. Application Data

(60) Provisional application No. 63/314,701, filed on Feb. 28, 2022.

(51) Int. Cl.
*H04L 9/40* (2022.01)
(52) U.S. Cl.
CPC ...... *H04L 63/1433* (2013.01); *H04L 63/1483* (2013.01)
(58) Field of Classification Search
CPC .................................................. H04L 63/1483
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,398,038 B2 | 7/2016 | Higbee et al. |
| 9,591,017 B1 | 3/2017 | Higbee et al. |
| 9,667,645 B1 | 5/2017 | Belani et al. |
| 9,912,687 B1 | 3/2018 | Wescoe et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

*Primary Examiner* — Khang Do
(74) *Attorney, Agent, or Firm* — Foley & Lardner LLP

(57) ABSTRACT

Systems and methods are provided for determining template difficulty based on user security maturity. In an example, a method includes communicating one or more simulated phishing communications to a plurality of users. Each of the users are assigned a user security maturity level of a plurality of user security maturity levels. The one or more simulated phishing communications are generated using a simulated phishing template. The method includes recording the user security maturity level of a user and a type of user interaction for each of the responses to the one or more simulated phishing communications from the users and determining, a failure rate of the simulated phishing template at each user security maturity level of the plurality of user security maturity levels based on the type of user interaction for each of the responses from one or more users assigned to each user security maturity level.

20 Claims, 13 Drawing Sheets

(56) References Cited

U.S. PATENT DOCUMENTS

| | | | |
|---|---|---|---|
| 10,749,887 B2* | 8/2020 | Hawthorn | H04L 63/1433 |
| 10,904,186 B1 | 1/2021 | Everton et al. | |
| 10,917,429 B1* | 2/2021 | Patton | H04L 63/1433 |
| 10,970,188 B1* | 4/2021 | Åvist | H04L 63/1441 |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 11,928,212 B2* | 3/2024 | McClay | H04L 63/1483 |
| 12,160,441 B2* | 12/2024 | Wescoe | H04L 63/20 |
| 2009/0040020 A1* | 2/2009 | Moyle | G06F 21/554 340/5.74 |
| 2016/0164898 A1 | 6/2016 | Belani et al. | |
| 2016/0301705 A1 | 10/2016 | Higbee et al. | |
| 2016/0330238 A1* | 11/2016 | Hadnagy | H04L 63/1483 |
| 2017/0244746 A1* | 8/2017 | Hawthorn | G06F 21/55 |
| 2018/0004948 A1* | 1/2018 | Martin | H04L 63/1425 |
| 2018/0159889 A1* | 6/2018 | Sjouwerman | G06F 21/56 |
| 2018/0295152 A1* | 10/2018 | Kras | H04L 63/1433 |
| 2018/0309764 A1* | 10/2018 | Kras | G06F 21/577 |
| 2019/0005428 A1* | 1/2019 | Kras | G06Q 10/06314 |
| 2019/0173819 A1 | 6/2019 | Wescoe et al. | |
| 2019/0173915 A1* | 6/2019 | Irimie | G06N 3/044 |
| 2019/0245885 A1 | 8/2019 | Starink et al. | |
| 2019/0356679 A1* | 11/2019 | Sites | H04L 63/1416 |
| 2020/0135049 A1* | 4/2020 | Atencio | G09B 19/0053 |
| 2020/0250303 A1* | 8/2020 | Lowry | G06F 11/3409 |
| 2020/0311260 A1 | 10/2020 | Klonowski et al. | |
| 2021/0021612 A1* | 1/2021 | Higbee | H04L 63/1416 |
| 2021/0152596 A1* | 5/2021 | Hemingway | H04L 63/1483 |
| 2021/0185075 A1 | 6/2021 | Adams | |
| 2021/0194924 A1 | 6/2021 | Heinemeyer et al. | |
| 2021/0279337 A1* | 9/2021 | Mosby | G06N 20/00 |
| 2021/0297432 A1* | 9/2021 | Hicks | H04L 63/20 |
| 2021/0390181 A1* | 12/2021 | McClay | G06N 20/00 |
| 2022/0005373 A1* | 1/2022 | Nelson | G06N 20/00 |
| 2022/0006830 A1* | 1/2022 | Wescoe | G06N 20/00 |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0130274 A1* | 4/2022 | Krishna Raju | H04L 63/1433 |
| 2022/0286419 A1 | 9/2022 | Stetzer et al. | |
| 2024/0388598 A1* | 11/2024 | Cartan | H04L 63/1425 |
| 2025/0036775 A1* | 1/2025 | Jackson | G06N 20/00 |

\* cited by examiner

DETERMINING TEMPLATE DIFFICULTY BASED ON SECURITY MATURITY

RELATED APPLICATIONS

This patent application claims the benefit of and priority to U.S. Provisional Patent Application No. 63/314,701 titled "DETERMINING TEMPLATE DIFFICULTY BASED ON SECURITY MATURITY," and filed Feb. 28, 2022, the contents of all of which are hereby incorporated herein by reference in its entirety for all purposes This disclosure generally relates to security awareness management. In particular, the present disclosure relates to systems and methods for determining the difficulty of a simulated phishing template for a user as a function of the user's security maturity.

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage are increasing every year. Many organizations use cybersecurity tools such as antivirus, anti-ransomware, anti-phishing, and other quarantine platforms to detect and intercept known cybersecurity attacks. However, new and unknown security threats involving social engineering may not be readily detectable by such cyber security tools, and the organizations may have to rely on their employees (referred to as users) to recognize such threats. To enable their users to stop or reduce the rate of cybersecurity incidents, the organizations may conduct security awareness training for their users. The security awareness training may include cybersecurity awareness training, for example via simulated phishing attacks, computer-based training, and such training programs.

To determine effectiveness of the security awareness training on their users, organizations may want to know how their users compare to their users' peers, that is to other users in the same organization or to users in organizations in the same industry or in all industries. One way of comparing two users is considering their average failure rate on simulated phishing tests. A user's failure rate on multiple simulated phishing tests and/or real phishing attacks may be referred to as a user's "Phish Prone Percentage" or PPP. At the extremes, a user with a PPP of 0% may never have failed a simulated phishing test or real phishing attack and a user with a PPP of 100% may have failed every simulated phishing test or real phishing attack that they have received.

The security maturity of a user is a representation of how attuned to cybersecurity threats the user is, which is a useful proxy for the level of risk that the user poses to the organization. The security maturity of a user may take into account information from different security maturity dimensions. An example of a security maturity dimension is security knowledge, which is a measure of how much knowledge related to cybersecurity threats a user has. Another example of a security maturity dimension is security awareness, which is a measure of how aware of the presence of simulated phishing attacks the user is, or how suspicious the user is of threats, even if the user may not know what the threats are or how to detect them. A further example of a security maturity dimension is security culture, which applies to the group or organization that the user works in or belongs to, and is a measure of the norms and actions of leadership and influential members of the group or organization in creating an environment which encourages and supports the development of a culture of security awareness and secure behaviors within the group, for example through communications, propaganda, incentives, rewards, and punishments.

The users in an organization may have a wide range of security maturities owing to a number of reasons. One of reasons may be that some users may have been exposed to a large amount of security awareness training previously, either at their current organization or at a past organization, whereas other users may have recently joined the organization and may never have been exposed to security awareness training of any kind. Another reason may be that some users may have been the victim of a malicious cybersecurity attack, resulting in these users having a heightened awareness of suspicious messages whereas other users may never have experienced any attack and may not be aware that attacks of this nature exist. A further reason is that some users may be a member of a group that has a strong culture around cybersecurity, with posters raising attack awareness and security maturity champions, whereas another user may be a member of a group where no such exposure to the perils of cybersecurity threats exist.

BRIEF SUMMARY OF THE DISCLOSURE

Systems and methods are provided for determining template difficulty as a function of user security maturity. In an example embodiment, a method for determining a failure rate of a simulated phishing template for users of particular user security maturity levels is described. The method includes communicating one or more simulated phishing communications to a plurality of users. Each of the plurality of users are assigned a user security maturity level of a plurality of user security maturity levels. The one or more simulated phishing communications as described herein are generated using a simulated phishing template. In some embodiments, the method includes recording the user security maturity level of the users that receive the one or more simulated phishing communications generated using the simulated phishing template, recording the users from the plurality of users that respond to the simulated phishing communications generated using the simulated phishing template and in some examples recording the type of interaction for each of the responses of the users, and determining a failure rate of the simulated phishing template at each user security maturity level of the plurality of user security maturity levels based on the number of users from the plurality of users at each user security maturity level that responded to the simulated phishing communications generated using the simulated phishing template, and in some examples the type of user interaction for each of the responses from users of the plurality of users at each user security maturity level that responded to the simulated phishing communications generated using the simulated phishing template. In some embodiments, the method includes providing, for display, the failure rate of the simulated phishing template at one or more user security maturity levels of the plurality of user security maturity levels.

In some embodiments, the method further comprising determining a difficulty of the simulated phishing template at one or more user security maturity levels of the plurality of user security maturity levels based at least on aggregating the failure rate of the simulated phishing template across the plurality of users at the one or more user security maturity levels of the plurality of user security maturity levels, that received the one or more simulated phishing communications using the simulated phishing template. In some embodiments, the method includes providing, for display, the difficulty of the simulated phishing template at one or more user security maturity levels of the plurality of user security maturity levels.

The plurality of users are from one of a same organization or from multiple organizations.

In some embodiments, the method further comprises determining the failure rate of the simulated phishing template as a function of one or more user security maturity levels of the plurality of user security maturity levels.

The type of user interaction for each of the responses from users of the plurality of users at each user security maturity level that responded to the simulated phishing communications generated using the simulated phishing template may include one of the following: clicking a link, forwarding the simulated phishing communication, opening an attachment to the simulated phishing communication, reporting the simulated phishing communication as suspicious, or performing no interaction with the simulated phishing communication.

In some embodiments, the method further includes determining the failure rate of the simulated phishing template responsive to a least a minimum number of the plurality of users at one or more user security maturity levels of the plurality of user security maturity levels receiving the one or more simulated phishing communications generated using the simulated phishing template.

In some embodiments, the method further includes recording each user response to a simulated phishing communication generated using the simulated phishing template.as a pair of data points comprising the user security maturity level of the user and the type of user interaction.

The plurality of user security maturity levels may be represented by one of a range of values or a set of labels. In examples, the simulated phishing template may be part of a group of simulated phishing templates. The failure rate determined for a simulated phishing template may be applied to each simulated phishing template within the group of simulated phishing templates comprising the simulated phishing template.

Other aspects and advantages of the disclosure will become apparent from the following detailed description, taken in conjunction with the accompanying drawings, which illustrate by way of example the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for determining template difficulty as a function of user security maturity.

A. Computing and Network Environment

Figure 1A:
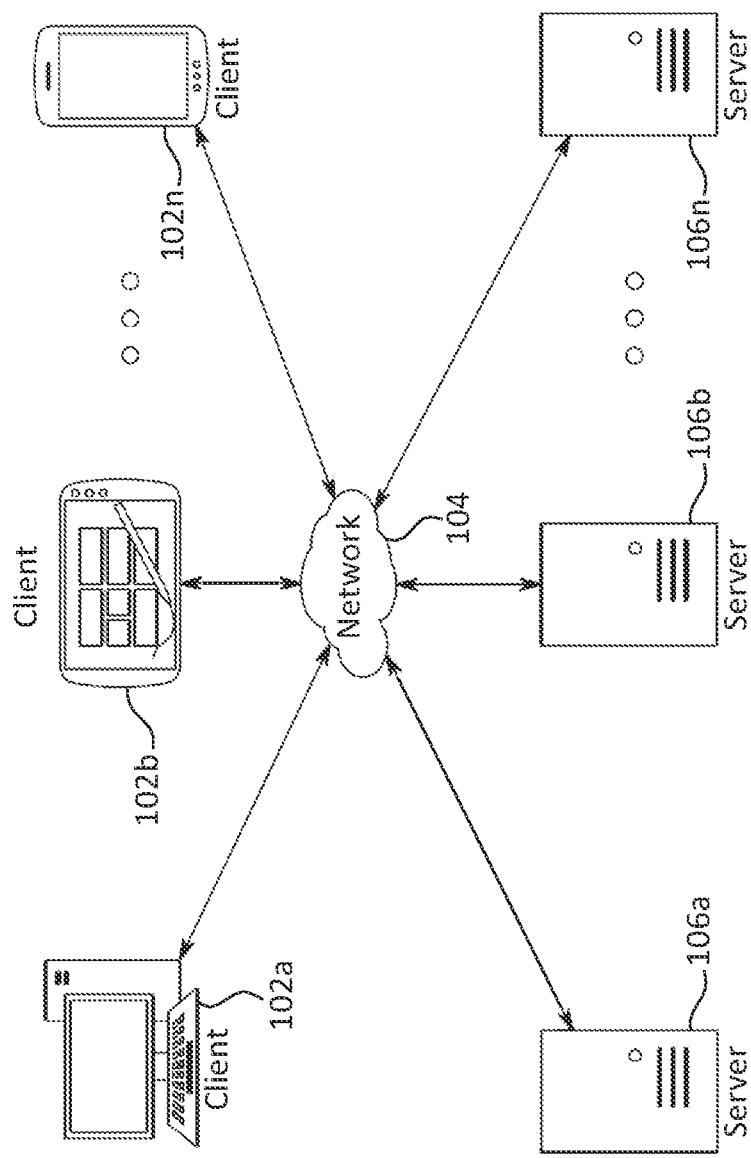
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the Internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous-one or more of the servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California: the Xen hypervisor, an open source product whose development is overseen by Citrix Systems, Inc. of Fort Lauderdale, Florida: the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
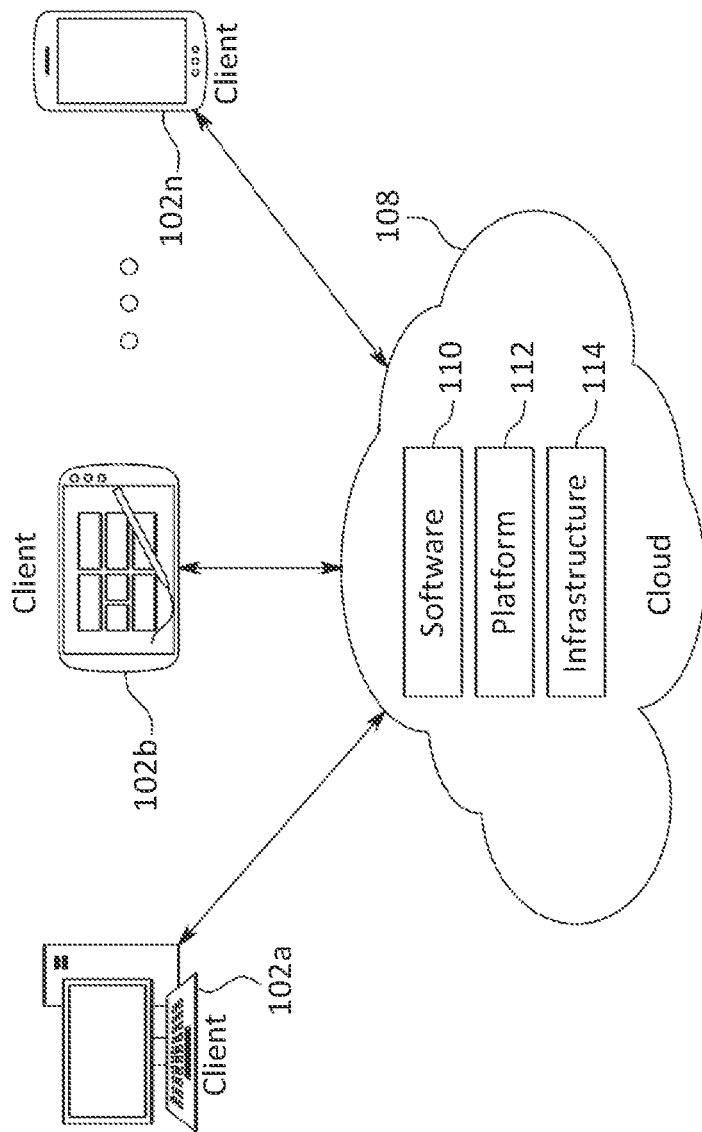
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (Saas) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft One Drive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
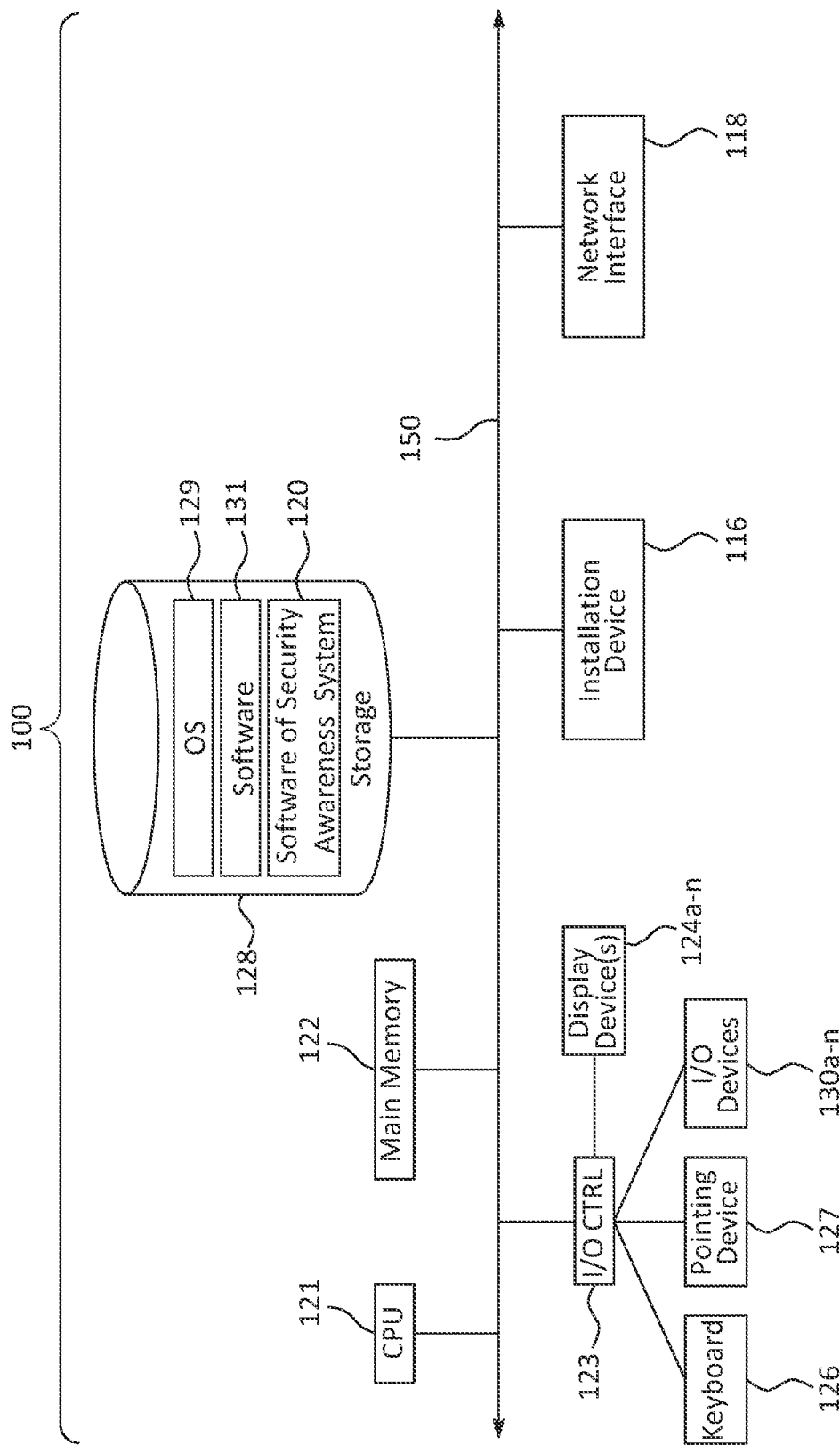
FIGS. 1C and 1D are block diagrams depicting embodiments of computing devices useful in connection with the methods and systems described herein.
Figure 1D:
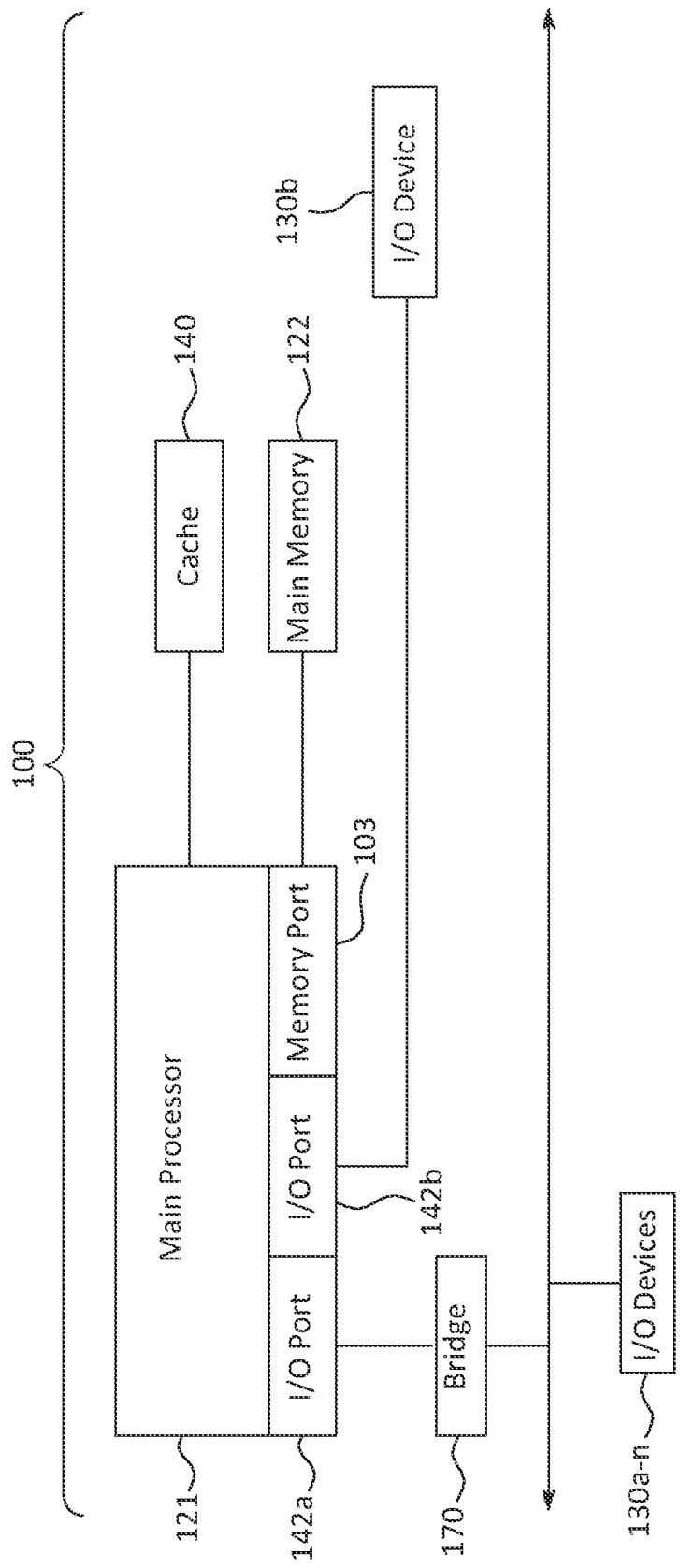

FIGS. 1C and 1D depict block diagrams of a computing device 100 useful for practicing an embodiment of the client 102 or a server 106. As shown in FIG. 1C and FIG. 1D, each computing device 100 includes a central processing unit (CPU) 121, and a main memory unit 122. As shown in FIG. 1C, a computing device 100 may include a storage device 128, an installation device 116, a network interface 118, and input/output (I/O) controller 123, display devices 124a-124n, a keyboard 126 and a pointing device 127, e.g., a mouse. The storage device 128 may include, without limitation, an operating system (OS) 129, software 131, and a software of a simulated phishing attack system 120. As shown in FIG. 1D, each computing device 100 may also include additional optional elements, e.g., a memory port 103, a bridge 170, one or more input/output (I/O) devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California: those manufactured by Motorola Corporation of Schaumburg, Illinois; the ARM processor and TEGRA system on a chip (SoC) manufactured by Nvidia of Santa Clara, California: the POWER7 processor, manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the central processing unit 121. Main memory unit 122 may be volatile and faster than storage 128 memory. Main memory units 122 may be Dynamic Random-Access Memory (DRAM) or any variants, including Static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile: e.g., non-volatile random access memory (NVRAM), flash memory non-volatile static RAM (nvSRAM), Ferroelectric RAM (FeRAM), Magnetoresistive RAM (MRAM), Phase-change RAM (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the central processing unit 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the central processing unit 121 communicates directly with cache memory 140 via a secondary bus, sometimes referred to as a backside bus. In other embodiments, the central processing unit 121 communicates with cache memory 140 using the system bus 150. Cache memory 140 typically has a faster response time than main memory 122 and is typically provided by SRAM, BSRAM, or EDRAM. In the embodiment shown in FIG. 1D, the central processing unit 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the central processing unit 121 may use an Advanced Graphic Port (AGP) to communicate with the display 124 or the I/O controller 123 for the display 124. FIG. 1D depicts and embodiment of a computer 100 in which the central processing unit 121 communicates directly with I/O device 130b or other processors 121' via HYPERTRANSPORT, RAPIDIO, or INFINIBAND communications technology. FIG. 1D also depicts an embodiment in which local busses and direct communication are mixed: the central processing unit 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation device 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g., a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode (LED) displays, digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise storage device 128 (e.g. one or more hard disk drives or redundant arrays of independent disks) for storing an operating system or other related software, and for storing application software programs such as any program related to the software of security awareness system 120. Examples of storage device 128 include, e.g., hard disk drive (HDD); optical drive including CD drive. DVD drive, or BLU-RAY drive: solid-state drive (SSD); USB flash drive; or any other device suitable for storing data. Some storage devices 128 may include multiple volatile and non-volatile memories, including, e.g., solid state hybrid drives that combine hard disks with solid state cache. Some storage devices 128 may be non-volatile, mutable, or read-only. Some storage devices 128 may be internal and connect to the computing device 100 via a bus 150. Some storage devices 128 may be external and connect to the computing device 100 via a I/O device 130 that provides an external bus. Some storage devices 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage devices 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA. GSM. WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIG. 1B and FIG. 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Washington; MAC OS and iOS, manufactured by Apple, Inc.; and Linux, a freely-available operating system, e.g. Linux Mint distribution ("distro") or Ubuntu, distributed by Canonical Ltd, of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Determining Template Difficulty as a Function of User Security Maturity The following describes systems and methods for determining template difficulty as a function of user security maturity. In examples, user security maturity and user security maturity level may be referred to as security maturity of a user or security maturity level of a user, or simply security maturity or security maturity level.

For an organization to know how their users compare to their users' peers with respect to security awareness, that is to other users in the same organization or to users in organizations in the same industry or in all industries, the organization currently may use a user's Phish Prone Percentage (PPP) score. Comparing two users' PPP without considering difficulty, for each of the two users given their respective security maturity, of the simulated phishing templates over which the user's responses were used in the calculation of the user's PPP, may not result in an accurate comparison of the users' security awareness. Even if the two users were sent the same simulated phishing templates, if the two users have different user security maturity levels, the same simulated phishing templates may not have the same difficulty for the two users that have different user security maturity levels.

A single difficulty level or rating for a simulated phishing template may therefore not apply to all users that may receive a simulated phishing communication based on the simulated phishing template. If a security awareness system administrator chooses simulated phishing templates for users based on a single difficulty level or rating for the simulated phishing templates without regard to the users' user security maturity levels, then aggregating a group of users' PPP across simulated phishing attacks based on those simulated phishing templates may not enable a comparison between the group's PPP with the PPP of another group of users that received simulated phishing attacks based on those simulated phishing templates, if the user security maturity levels of the two groups of users are different.

When simulated phishing templates are assigned a single difficulty level or rating for users of all user security maturity levels, the security awareness system administrator would be unable to assess the security awareness of a diverse group of users based on the users' PPP, even if the diverse group of users are all sent the exact same group of simulated phishing templates. The systems and methods of this disclosure provide techniques to determine a difficulty of a simulated phishing template relative to the security maturity of the user receiving it, enabling a security awareness system administrator to meaningfully benchmark diverse users against each other. Benchmarking users against one another in an accurate and reliable way enables the organization to determine which users do not meet organizational expectations with respect to security awareness and who may therefore be a significant cybersecurity risk to the organization. Being able to identify such users reliably enables the organization to provide appropriate security awareness training and/or limit the users' access to sensitive company information.

The systems and methods of this disclosure describe how aggregated failure rates and/or difficulty levels or ratings for simulated phishing templates are calculated based on user responses and knowledge of the users' user security maturity levels or scores, where there is a difficulty level or rating determined for a simulated phishing template for users at each user security maturity level. An aggregated failure rate of a template is created by considering the responses of multiple users to simulated phishing communications based on the simulated phishing template and determining the percentage of users that failed the simulated phishing communication. In examples, the aggregated failure rate of a simulated phishing template may be referred to as a failure rate of a simulated phishing template, or a difficulty level of a simulated phishing template, or a difficulty rating of a simulated phishing template or a difficulty of a simulated phishing template.

Simulated phishing templates may be grouped where they are sufficiently similar for the purpose of determining a difficulty level or rating, which may then be applied to every simulated phishing template in the group. Configurability of simulated phishing templates (for example using fewer or greater exploits or fewer or greater social engineering indicators) may be reflected in the difficulty level or rating for the simulated phishing template for a user security maturity level using a boost factor or an adjustment. As simulated phishing templates become older or have been sent more often (in either case, potentially becoming better known), the difficulty level or rating for the simulated phishing template for a user security maturity level may be decreased in an adjustment called aging. The manner in which users at a given user security maturity level interact with a simulated phishing template may also contribute to the determination of the difficulty level or rating for the simulated phishing template for that user security maturity level. Difficulty levels or ratings for simulated phishing templates for different user security maturity levels may be determined based on failure rates of users at those different user security maturity levels, upon those users receiving simulated phishing communications based on the simulated phishing template.

Figure 2:
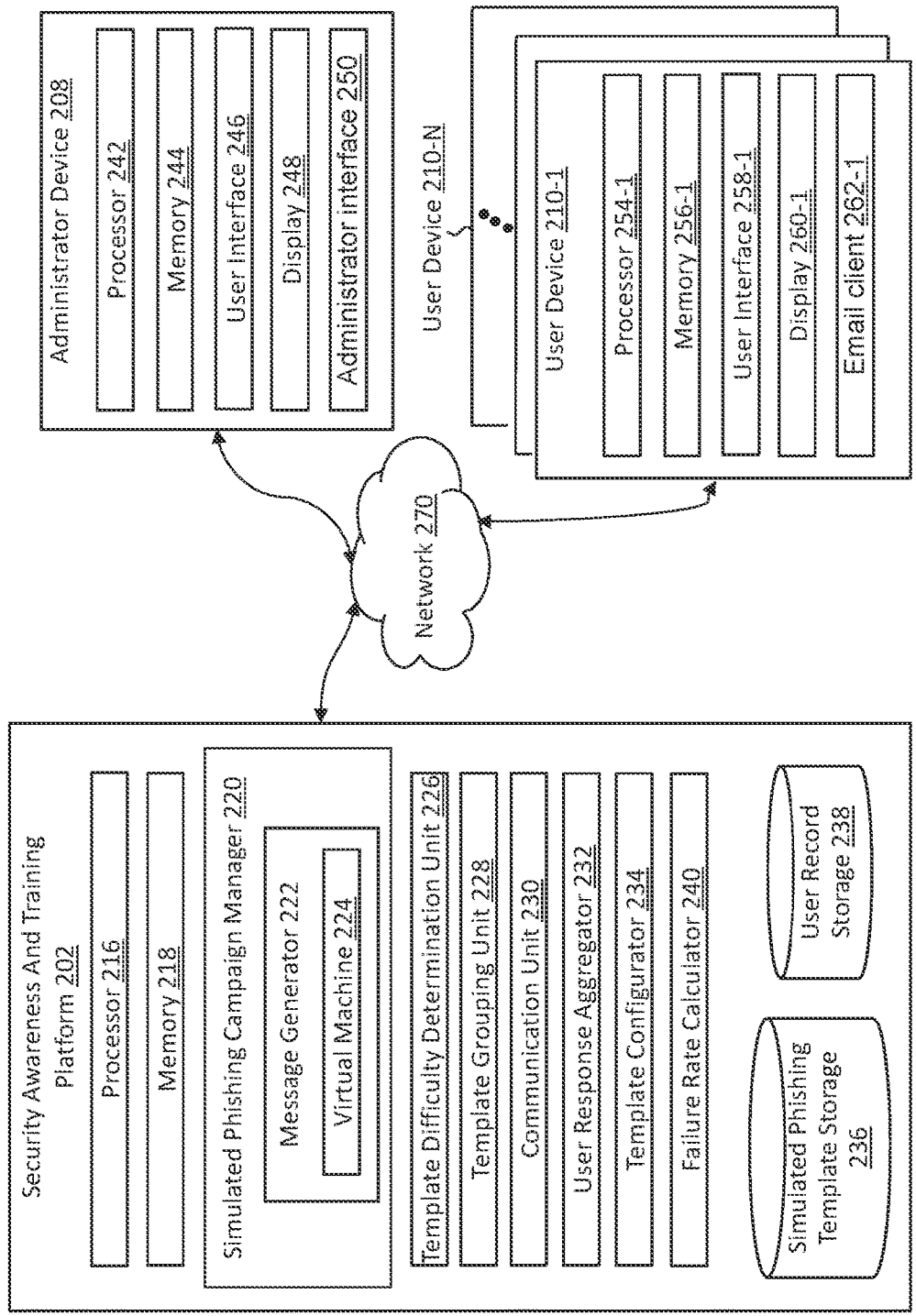
FIG. 2 depicts an implementation of some of the server architecture of an implementation of a system for determining simulated phishing template difficulty as a function of user security maturity, according to one or more embodiments.

Referring to FIG. 2, in a general overview, FIG. 2 depicts some of the server architecture of an implementation of a system 200 for determining template difficulty based on user security maturity, according to some embodiments. The template as described may refer to a simulated phishing template. System 200 may be a part of security awareness system 120. System 200 may include security awareness and training platform 202, administrator device 208, user device(s) 210(1-N), and network 270 enabling communication between the system components for information exchange. Network 270 may be an example or instance of network 104, details of which are provided with reference to FIG. 1A and its accompanying description.

According to some embodiments, security awareness and training platform 202 may be implemented in a variety of computing systems, such as a mainframe computer, a server, a network server, a laptop computer, a desktop computer, a notebook, a workstation, and the like. In an implementation, security awareness and training platform 202 may be implemented in a server, such as server 106 shown in FIG. 1A. In some implementations, security awareness and training platform 202 may be implemented by a device, such as computing device 100 shown in FIG. 1C and FIG. 1D. In some embodiments, security awareness and training platform 202 may be implemented as a part of a cluster of servers. In some embodiments, security awareness and training platform 202 may be implemented across a plurality of servers, thereby, tasks performed by security awareness and training platform 202 may be performed by the plurality of servers. These tasks may be allocated among the cluster of servers by an application, a service, a daemon, a routine, or other executable logic for task allocation.

In one or more embodiments, security awareness and training platform 202 may facilitate cybersecurity awareness training via simulated phishing attacks. In some implementations, security awareness and training platform 202 may be owned or managed or otherwise associated with an organization or any entity authorized thereof. A simulated phishing attack is a technique of testing a user to see whether the user is likely to recognize a true malicious phishing attack and act appropriately upon receiving the malicious phishing attack. The simulated phishing attack may include links, attachments, macros, or any other simulated phishing threat (also referred to as an exploit) that resembles a real phishing threat. In response to a user interaction with the simulated phishing attack, for example, if the user clicks on a link (i.e., a simulated phishing link), the user may be provided with security awareness training. In an example, security awareness and training platform 202 may be a Computer Based Security Awareness Training (CBSAT) system that performs security services such as performing simulated phishing attacks on a user or a set of users of the organization as a part of security awareness training.

According to some embodiments, security awareness and training platform 202 may include processor 216 and memory 218. For example, processor 216 and memory 218 of security awareness and training platform 202 may be CPU 121 and main memory 122, respectively as shown in FIG. 1C and FIG. 1D. Further, security awareness and training platform 202 may include simulated phishing campaign manager 220. Simulated phishing campaign manager 220 may include various functionalities that may be associated with cybersecurity awareness training. In an implementation, simulated phishing campaign manager 220 may be an application or a program that manages various aspects of a simulated phishing attack, for example, tailoring and/or executing a simulated phishing attack. A simulated phishing attack may test the readiness of a user to handle phishing attacks such that malicious actions are prevented. For instance, simulated phishing campaign manager 220 may monitor and control timing of various aspects of a simulated phishing attack including processing requests for access to attack results, and performing other tasks related to the management of a simulated phishing attack.

In some embodiments, simulated phishing campaign manager 220 may include message generator 222 having a virtual machine 224. Message generator 222 may be an application, service, daemon, routine, or other executable logic for generating messages. The messages generated by message generator 222 may be of any appropriate format. For example, the messages may be email messages, text messages, short message service (SMS) messages, instant messaging (IM) messages used by messaging applications such as, e.g. WhatsApp™, or any other type of message. Message type to be used in a particular simulated phishing communication may be determined by, for example, simulated phishing campaign manager 220. The messages may be generated in any appropriate manner, e.g. by running an instance of an application that generates the desired message type, such as running, e.g. a Gmail® application, Microsoft Outlook™, WhatsApp™, a text messaging application, or any other appropriate application. The messages may be generated by running a messaging application on virtual machine 224 or may be run in any other appropriate environment. The messages may be generated to be in a format consistent with specific messaging platforms, for example, Outlook 365™, Outlook® Web Access (OWA), Webmail™, iOS®, Gmail®, and so on.

In an implementation, message generator 222 may be configured to generate simulated phishing communications using an appropriate simulated phishing template. A simulated phishing template is a framework used to create simulated phishing communications. In some examples, the simulated phishing template may specify the layout and content of the simulated phishing communications. In some examples, the simulated phishing template may be designed according to a theme or subject matter. The simulated phishing template may be configurable by a security awareness system administrator. For example, the security awareness system administrator may be able to add dynamic content to the simulated phishing template, such as a field that will populate with the recipient's name and email address when message generator 222 prepares simulated phishing communications based on the simulated phishing template for sending to the user. In an example, the security awareness system administrator may be able to select one or more exploits to include in the simulated phishing template, for example, one or more simulated malicious URLs, one or more simulated macros, and/or one or more simulated attachments. An exploit is a user interactable phishing tool in templates that can be clicked on or otherwise interacted with by the user. A simulated phishing template customized by the security awareness system administrator may be stored in simulated phishing template storage 236 such that the simulated phishing template can be used for multiple different users in the organization over a period of time or for different campaigns. In some examples, a security awareness system administrator may select a simulated phishing template from a pool of available simulated phishing templates stored in simulated phishing template storage 236 and may send such a "stock" template to users unchanged.

In some examples, the simulated phishing communications may include one or more social engineering indicators. A social engineering indicator may be an artifact in a simulated (or actual) phishing communication that a user may be trained to recognize. Training the user to recognize social engineering indicators may result in the user becoming suspicious of the communication and may prevent or reduce any user interaction with the communication, and instead the user may report the communication as being suspicious. Examples of social engineering indicators may include misspelled words, domains of the sender not aligning with the content of the email, images designed to look like company logos that are not quite correct, and such indicators. Simulated phishing communications may be more or less difficult for users to detect. A simulated phishing communication that includes fewer social engineering indicators may be more difficult for a user to detect than one with several social engineering indicators. Simulated phishing communications including one or more social engineering indicators may be used in simulated phishing attacks or in simulated phishing campaigns.

Referring again to FIG. 2, in some embodiments, security awareness and training platform 202 may include template difficulty determination unit 226. Template difficulty determination unit 226 determines a difficulty level or rating of a simulated phishing template as a function of user security maturity. The template difficulty level or rating determined by template difficulty determination unit 226 may reflect that a given simulated phishing template may be more difficult for users with a lower security maturity and less difficult for users with a higher security maturity. In some examples, template difficulty determination unit 226 may determine a template difficulty level or rating by aggregating failure rates across users of a user security maturity level (for example, users of the same user security maturity level) and from a single organization, that receive simulated phishing communications based on the simulated phishing template. In some examples, template difficulty determination unit 226 may aggregate the failure rates across users of the same user security maturity level and across multiple organizations, that receive simulated phishing communications based on a simulated phishing template, for example, across all organizations in a given industry segment, in a given geographical region, or organizations that share any one or more attributes. In some examples, template difficulty determination unit 226 aggregates failure rates across users of the same user security maturity level that have received simulated phishing communications based on the simulated phishing template for all organizations that use security awareness system 120. In some examples, template difficulty determination unit 226 may collect data from multiple organizations in order to include a sufficient number of users at a user security maturity level to determine a statistically significant failure rate for that user security maturity level for that simulated phishing template. Determining the simulated phishing template difficulty level or rating is further explained in detail below.

Referring again to FIG. 2, in some embodiments, security awareness and training platform 202 may include template grouping unit 228. Template grouping unit 228 is configured to group simulated phishing templates. In some examples, template grouping unit 228 groups simulating phishing templates together based on similarity. Template grouping unit 228 may apply different measurements of similarity to group simulated phishing templates. For example, template grouping unit 228 may group simulated phishing templates that share one or more attributes of theme, exploit type, number of exploits, or any other attribute or similarity into a group of simulated phishing templates. In some embodiments, security awareness and training platform 202 may include communication unit 230. Communication unit 230 is configured to communicate the one or more simulated phishing communications generated by the message generator 222, to a plurality of users. In examples communication unit 230 may be configured to communicate the one or more simulated phishing communications to a plurality of users by email, which may be sent over network 270 to user devices 210-(1-N) and received by email clients 262-(1-N). In examples, communication unit 230 may be configured to communicate the one or more simulated phishing communications to a plurality of users by directly injecting the simulated phishing communications into a user inboxes of email clients 262-(1-N). In examples, communication unit 230 may be configured to communicate the one or more simulated phishing communications to a plurality of users via text messages, short message service (SMS) messages, instant messaging (IM) messages used by messaging applications such as, e.g. WhatsApp™, or any other type of message.

User response aggregator 232 may receive users' responses to the one or more simulated phishing communications. The users' responses may include any type of user interaction with the simulated phishing communication such as clicking the simulated phishing communication, forwarding the simulated phishing communication, reporting the simulated phishing communication, taking no action on the simulated phishing communication and such actions. In some examples, user response aggregator 232 may record a manner in which a user interacts with the simulated phishing communications (including whether they interact with the simulated phishing communication at all) in order to distinguish the type of user interaction. User response aggregator 232 may record details of the plurality of users who responded to the simulated phishing communication, for example user security maturity levels of the users and the type of user interaction for each of the responses to the one or more simulated phishing communications from the plurality of users. User response aggregator 232 may process information including the details of the users who responded to the simulated phishing communication, user security maturity levels of the users, and the type of user interactions for each of the responses to the one or more simulated phishing communications from the plurality of users.

Template configurator 234 enables configuration of simulated phishing templates such as adding or removing exploits, adding or removing social engineering indicators, adding or removing dynamic elements, and other such template configurable aspects. Template configurator 234 may apply limits and constraints on the ability of the security awareness system administrator to configure simulated phishing templates in some situations for example by limiting the simulated phishing template configuration capability, limiting maximum number of exploits, and/or limiting the number of social engineering indicators.

Failure rate calculator 240 may determine a failure rate of the simulated phishing template at each user security maturity level of the plurality of user security maturity levels based on the type of user interaction for each of responses for one or more simulated phishing communication from one or more users assigned to each user security maturity level.

In some embodiments, security awareness and training platform 202 may include simulated phishing template storage 236 and user record storage 238. In an implementation, simulated phishing template storage 236 may store simulated phishing communication templates, and user record storage 238 may store user security maturity levels of users and one or more contextual parameters for users of an organization. A contextual parameter for a user may include information associated with the user that may be used to make a simulated phishing communication more relevant to that user. Simulated phishing communication templates and simulated phishing communications stored in simulated phishing template storage 236, and user security maturity levels of the user and the one or more contextual parameters for the users stored in user record storage 238 may be periodically or dynamically updated as required.

Referring back to FIG. 2, in some embodiments, administrator device 208 may be any device used by an administrator to perform administrative duties. Administrator device 208 may be any computing device, such as a desktop computer, a laptop, a tablet computer, a mobile device, a Personal Digital Assistant (PDA), smart glasses, or any other computing device. In an implementation, administrator device 208 may be a device, such as client device 102 shown in FIG. 1A and FIG. 1B. Administrator device 208 may be implemented by a device, such as computing device 100 shown in FIG. 1C and FIG. 1D. According to some embodiments, administrator device 208 may include processor 242 and memory 244. In an example, processor 242 and memory 244 of administrator device 208 may be CPU 121 and main memory 122, respectively, as shown in FIG. 1C and FIG. 1D. Administrator device 208 may also include user interface 246, such as a keyboard, a mouse, a touch screen, a haptic sensor, a voice-based input unit, or any other appropriate user interface. It shall be appreciated that such components of administrator device 208 may correspond to similar components of computing device 100 in FIG. 1C and FIG. 1D, such as keyboard 126, pointing device 127, I/O devices 130a-n and display devices 124a-n. Administrator device 208 may also include display 248, such as a screen, a monitor connected to the device in any manner, a wearable glass, or any other appropriate display. In an implementation, administrator device 208 may display received content (for example, a simulated phishing communication based on a simulated phishing template) for the user using display 248 and is able to accept user interaction via user interface 246 responsive to the displayed content. In some implementations, administrator device 208 may include an administrator interface 250. The administrator interface may be supported by a library, an application programming interface (API), a set of scripts, or any other code that may enable the security awareness system administrator to manage security awareness and training platform 202.

Referring again to FIG. 2, in some embodiments, user device 210-1 may be any device used by a user. The user may be an employee of an organization, a client, a vendor, a customer, a contractor, or any person associated with the organization. User device 210-1 may be any computing device, such as a desktop computer, a laptop, a tablet computer, a mobile device, a Personal Digital Assistant (PDA), or any other computing device. In an implementation, user device 210-1 may be a device, such as client device 102 shown in FIG. 1A and FIG. 1B. User device 210-1 may be implemented by a device, such as computing device 100 shown in FIG. 1C and FIG. 1D. According to some embodiments, user device 210-1 may include processor 254-1 and memory 256-1. In an example, processor 254-1 and memory 256-1 of user device 210-1 may be CPU 121 and main memory 122, respectively, as shown in FIG. 1C and FIG. 1D. User device 210-1 may also include user interface 258-1, such as a keyboard, a mouse, a touch screen, a haptic sensor, a voice-based input unit, or any other appropriate user interface. It shall be appreciated that such components of user device 210-1 may correspond to similar components of computing device 100 in FIG. 1C and FIG. 1D, such as keyboard 126, pointing device 127, I/O devices 130a-n and display devices 124a-n. User device 210-1 may also include display 260-1, such as a screen, a monitor connected to the device in any manner, or any other appropriate display. In an implementation, user device 210-1 may display received content (for example, messages) for the user using display 260-1 and is able to accept user interaction via user interface 258-1 responsive to the displayed content.

Referring again to FIG. 2, in some embodiments, user device 210-1 may include email client 262-1. In one example, email client 262-1 may be an application that can be accessed over network 270 without being installed on user device 210-1. In an implementation, email client 262-1 may be any application capable of composing, sending, receiving, and reading email messages. In an example, email client 262-1 may facilitate a user to create, receive, organize, and otherwise manage email messages. In an implementation, email client 262-1 may be an application that runs on user device 210-1. In some implementations, email client 262-1 may be an application that runs on a remote server or on a cloud implementation and is accessed by a web browser. For example, email client 262-1 may be an instance of an application that allows viewing of a desired message type, such as any web browser, Microsoft Outlook™ application (Microsoft, Mountain View, California), IBM® Lotus Notes R: application, Apple® Mail application, Gmail® application (Google, Mountain View, California), WhatsApp™ (Facebook, Menlo Park, California), a text messaging application, or any other known or custom email application. In an example, a user of user device 210-1 may be mandated to download and install email client 262-1 by the organization. In another example, email client 262-1 may be provided by the organization as default. In some examples, a user of user device 210-1 may select, purchase and/or download email client 262-1 through an application distribution platform. In some examples, user device 210-1 may receive simulated phishing communications via email client 262-1.

As described, the users in an organization (or users that belong to a group in the organization) may have a wide range of user security maturities. As previously described, user security maturity may refer to a qualitative or quantitative representation of how competent and savvy a user is where it comes to cybersecurity. The determination of security maturity of a user may take into account a user's performance in simulated phishing campaigns, the amount of training they have received, and the duration of time a user has been within a security awareness system. In some examples, the user security maturity of all users that receive the simulated phishing communications may be known. In some examples, the user security maturity of users may have to be determined. For example, user security maturity of a user who has recently joined an organization may not be known and thus may have to be determined by security awareness and training platform 202. Security awareness and training platform 202 may determine and assign a user security maturity level of a plurality of user security maturity levels to users of security awareness and training platform 202.

Security awareness and training platform 202 may have a collection of simulated phishing templates. In some examples, the simulated phishing templates may not be grouped or organized. Template grouping unit 228 may group the simulated phishing templates together into a group of simulated phishing templates based on similarity, such as similarity in one or more attributes of theme, exploit type, number of exploits, or any other attribute or similarity. Once a group of simulated phishing templates is formed, security awareness and training platform 202 may select a simulated phishing template from the group of simulated phishing templates for generating one or more simulated phishing communications. Security awareness and training platform 202 may trigger communication unit 230 to communicate the generated one or more simulated phishing communications generated from simulated phishing templates in the group of simulated phishing templates to a plurality of users. In one or more embodiments, template difficulty determination unit 226 may use failure rates across users of a user security maturity level of a plurality of user security maturity levels who receive the one or more simulated phishing communications generated from simulated phishing templates in the group of simulated phishing templates to determine the template group difficulty level or rating for that user security maturity level, (further explained below), which is subsequently applied to all simulated phishing templates in that group. In some examples, template grouping unit 228 may organize the simulated phishing templates into template groups initially such that sufficient user response data to simulated phishing communications generated from simulated phishing templates in the group of simulated phishing templates may be aggregated to form a difficulty level or rating for the simulated phishing templates in the group across the plurality of users at a user security maturity level. When template grouping unit 228 collects sufficient data for a simulated phishing template from the group of simulated phishing templates in order to form a template difficulty level or rating for a user security maturity level, of sufficient statistically significance from data for that simulated phishing template on its own (for one or more user security maturity levels), template grouping unit 228 may assign the simulated phishing template, which had been assigned the template group difficulty level or rating for the user security maturity level up to that point, its own template difficulty level or rating for the user security maturity level. As described below, this may be for a single user security maturity level. (i.e., the simulated phishing template has its own difficulty level or rating at one user security maturity level and is assigned the template group difficulty level or rating at other user security maturity levels) in the case that there is only sufficient user response data at a single user security maturity level to determine a statistically significant difficulty level or rating for the simulated phishing template at the user security maturity level.

When a simulated phishing template that has been assigned a template group difficulty level or rating for one user security maturity level and the simulated phishing template is then assigned its own difficulty level or rating for that user security maturity level, template grouping unit 228 may remove the simulated phishing template from the template group at that user security maturity level such that it is no longer used in the determination of a difficulty level or rating for the template group at that user security maturity level. In some examples, template grouping unit 228 may leave the simulated phishing template in the template group at that user security maturity level such that it continues to contribute to the template group difficulty level or rating, even though the simulated phishing template is assigned its own difficulty level or rating at that user security maturity (i.e., it does not use the template group difficulty level or rating for that user security maturity).

For the purposes of simplicity and brevity, the systems and methods of this disclosure will be described in the context of a single simulated phishing template, however, in each situation the systems and methods are applicable to a group of simulated phishing templates in place of a single simulated phishing template.

To determine the template difficulty level or rating for a simulated phishing template for a user security maturity level, simulated phishing campaign manager 220 may generate one or more simulated phishing communications using the simulated phishing template. Communication unit 230 may communicate the generated one or more simulated phishing communications to a plurality of users at the user security maturity level. Some users of the plurality of users may respond or otherwise interact with the one or more simulated phishing communications. As previously described, user response aggregator 232 may receive and record users' responses to the one or more simulated phishing communications including the manner in which users interact with the simulated phishing communication (including no interaction) and any type of user interaction such as clicking a simulated phishing communication, forwarding a simulated phishing communication, opening an attachment of a simulated phishing communication, reporting the simulated phishing communication, taking no action on the simulated phishing communication and such actions. As previously described, in some examples, user response aggregator 232 may record the user security maturity level of the user who interacted with the simulated phishing communications together with the type of user interaction. User response aggregator 232 may process the recorded details into a data point. Each incidence of a user receiving a simulated phishing communication may therefore result in a data point that includes the user's security maturity in addition to information about the user's response to the simulated phishing communication based on the simulated phishing template. In an example, user response aggregator 232 may store the datapoint in a form of data pair, for example:

datapoint=(user security maturity level, response), where, in one example, user security maturity level is the user security maturity level of the user that received the simulated phishing communication based on the simulated phishing template. In an example, the user security maturity level may be represented by any range of values or set of qualitative labels. For the purposes of this disclosure, the user security maturity levels of users are expressed as a whole number between 0 and 10, where a level of 0 is assigned to users that have the lowest user security maturity and a level of 10 is assigned to users that have the highest user security maturity. The methods and systems in this disclosure may be readily applied to other scales (quantitative or qualitative) for user security maturity.

Some examples of datapoints represented in form of data pairs are provided as follows:

(0, click),
(3, open_attachment),
(6, forward),
(8, nothing),
(10, report),

In some examples, user response aggregator 232 may append user identification information to the datapoint, resulting in a datapoint tuple. For example, the datapoint tuple may be given by:

datapoint=(user ID, user security maturity level, response).

In some examples, user response aggregator 232 may record user responses as a set of values, which may facilitate post processing of the data. In examples, user response aggregator 232 may process the information into a datapoint that includes the set of values. For example, the datapoint including the set of values is given by:

datapoint={userID, clicks, forward, open_attachment, nothing, report}.

The userID field of the set of values may be a number of bits long, for example, sufficiently long to represent every userID in security awareness system 120. If userIDs are not unique between organizations, user response aggregator 232 may prepend or append an organization ID to the userID to make a composite ID. The clicks field of the set of values may be a binary field, that is {0, 1}, where 0 represents the case where the user did not click on any actionable element of the simulated phishing communication based on the simulated phishing template, and 1 represents the case where the user clicked on at least one actionable element of the simulated phishing communication based on the simulated phishing template. In some examples, the clicks field may be a number of bits representing the number of actionable elements the user clicked on in the simulated phishing communication based on the simulated phishing template. For example, the number of bits may be a three-bit field that can represent the number of clicks on a simulated phishing communication based on the simulated phishing template with up to 7 exploits, that is, for example, [0, 1, 2, 3, 4, 5, 6, 7].

The forward field may be a binary field, that is {0, 1}, where 0 represents the case where the user did not forward the simulated phishing communication based on the simulated phishing template and where 1 represents the case where the user forwarded the simulated phishing communication based on the simulated phishing template to another user (for example, other than a security awareness system administrator). The Open_attachment field may be a binary field, that is {0, 1}, where 0 represents the case where the user did not open the attachment to the simulated phishing communication based on the simulated phishing template and where 1 represents the case where the user did open the attachment to the simulated phishing communication based on the simulated phishing template. The Nothing field may be a binary field, that is {0, 1}, where 0 represents the case where the user did nothing at all with the simulated phishing communication based on the simulated phishing template and where 1 represents the case where the user interacted with the simulated phishing communication based on the simulated phishing template in any way, such as viewing the simulated phishing communication based on the simulated phishing template in a viewing pane, hovering over an element in the simulated phishing communication based on the simulated phishing template, or opening the simulated phishing communication based on the simulated phishing template and then closing it. The report may be a binary field (i.e., {0, 1}) where 0 represents the case where the user did not report the simulated phishing communication based on the simulated phishing template, and 1 represents the case where the user reported the simulated phishing communication based on the simulated phishing template to a security awareness system administrator.

In some examples, user response aggregator 232 may collect and record responses for many users at each user security maturity level. Failure rate calculator 240 may determine a failure rate of the simulated phishing template at each user security maturity level of the plurality of user security maturity levels based on the type of user interaction for each of the responses from one or more users assigned to each user security maturity level. User response aggregator 232 may aggregate such failure rates leading to a failure rate for a nominal user at a given user security maturity level. A failure rate is an average of template failure rates across users at a given user security maturity level who receive that template or a template from the group of templates comprising that template. Template difficulty determination unit 226 may use the failure rate to determine the template or template group difficulty level or rating for users at a given user security maturity level, which is subsequently applied to all templates in that group. In one or more embodiments, a minimum number of user responses of users at a given user security maturity level may be required before a failure rate for the simulated phishing template for that user security maturity level may be determined. In some examples, the required number of user responses could be based on a desired statistical confidence level. In examples, the number of user responses necessary to achieve a desired statistical confidence level may vary depending on the failure rate that is determined for users at a given user security maturity level. For example, for a lower failure rate, more responses are needed, therefore there could be a different number of required responses to achieve a desired statistical confidence level depending on the trend of the failure rate over user security maturity levels.

In some examples, simulated phishing communications based on a simulated phishing template are to be sent to a minimum number of users at a given user security maturity level before a failure rate for that user security maturity level may be determined. In examples, user response aggregator 232 may have to receive a minimum number of responses from users at a given user security maturity level to a simulated phishing communication based on the simulated phishing template for a failure rate for the simulated phishing template for users at that user security maturity level to be determined. In some examples, where a minimum number of responses is established, user response aggregator 232 may apply the number of responses as a "rolling window", where once the minimum number of responses is reached, user response aggregator 232 drops the oldest response for each new response recorded.

In some examples, a minimum number of responses required to determine a failure rate of a simulated phishing template at a given user security maturity level may be reached at different times for different user security maturity levels for the same simulated phishing template. In an example, once a failure rate is determined for two or more user security maturity levels for a simulated phishing template, user response aggregator 232 may apply a trendline to estimate the failure rate at other user security maturity levels, for example, until such time as there are sufficient responses at other user security maturity levels to determine a failure rate for those user security maturity levels.

Table 1 shows a look up table representing the failure rate for a simulated phishing template across a range of user security maturity levels of users. The values in the table represent measured failure rates for subsets of users at each user security maturity level.

TABLE 1 failure rates for a simulated phishing template as a function of user security maturity level.

| User Security Maturity Level | Failure Rate |
|---|---|
| 0 | 80% |
| 1 | 65% |
| 2 | 50% |
| 3 | 40% |
| 4 | 33% |
| 5 | 26% |
| 6 | 15% |
| 7 | 7% |
| 8 | 2% |

TABLE 1-continued failure rates for a simulated phishing template as a function of user security maturity level.

| User Security Maturity Level | Failure Rate |
|---|---|
| 9 | 1% |
| 10 | 0% |

Figure 3:
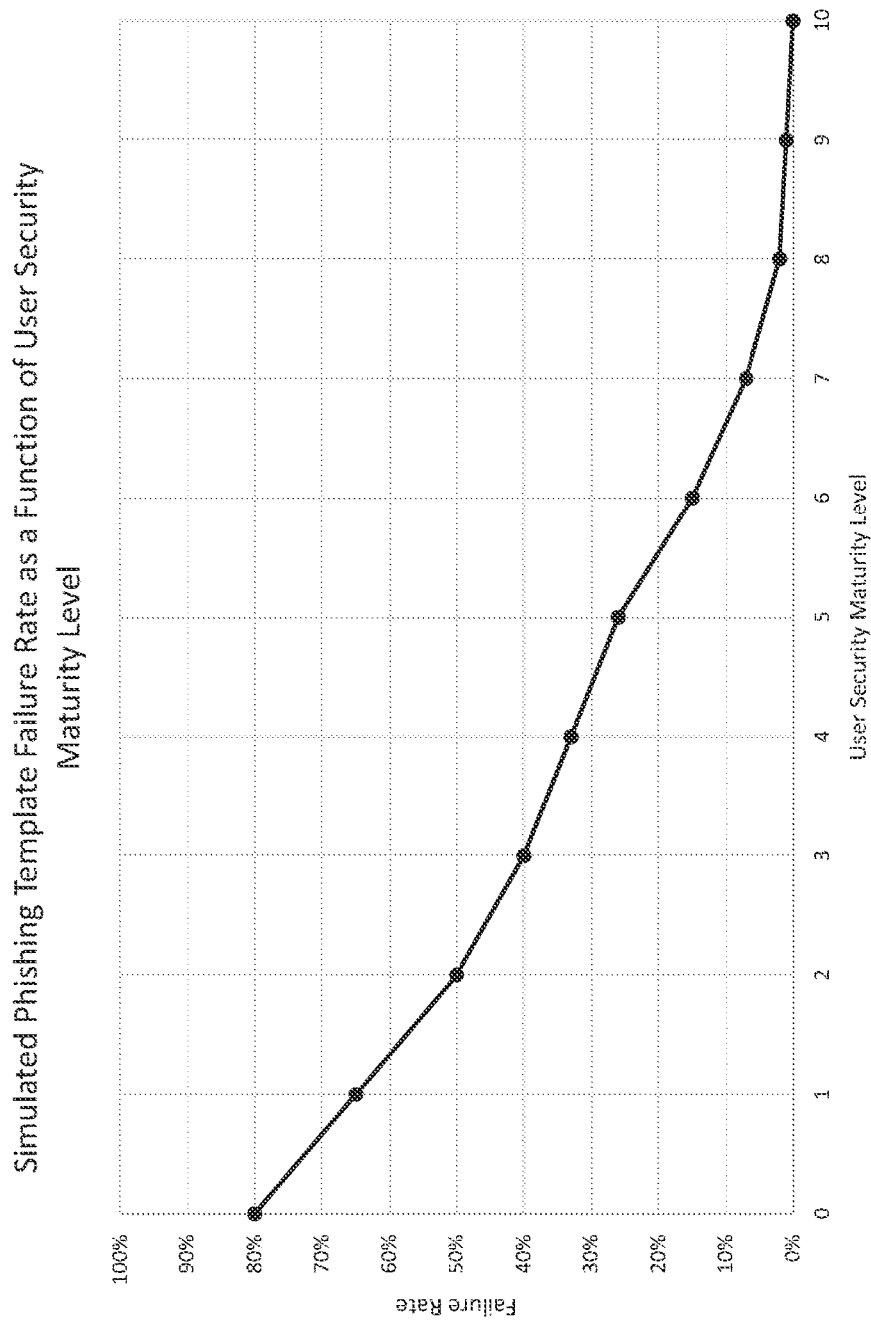
FIG. 3 depicts a graph illustrating a curve of a simulated phishing template failure rate as a function of user security maturity level, according to one or more embodiments.

The failure rates represented in Table 1 are shown as a curve as in FIG. 3. User response aggregator 232 may store the determined failure rates, for example, as a look up table in simulated phishing template storage 236. FIG. 3 is an example of failure rate data for each of 10 user security maturity levels.

In some examples, there may not be sufficient failure rate data for a simulated phishing template at some user security maturity levels, as shown in Table 2.

TABLE 2

Incomplete failure rates for a simulated phishing template as a function of user security maturity level

| User Security Maturity Level | Failure Rate |
|---|---|
| 0 | 70% |
| 1 | |
| 2 | |
| 3 | |
| 4 | 30% |
| 5 | |
| 6 | 15% |
| 7 | |
| 8 | |
| 9 | 1% |
| 10 | |

Figure 4:
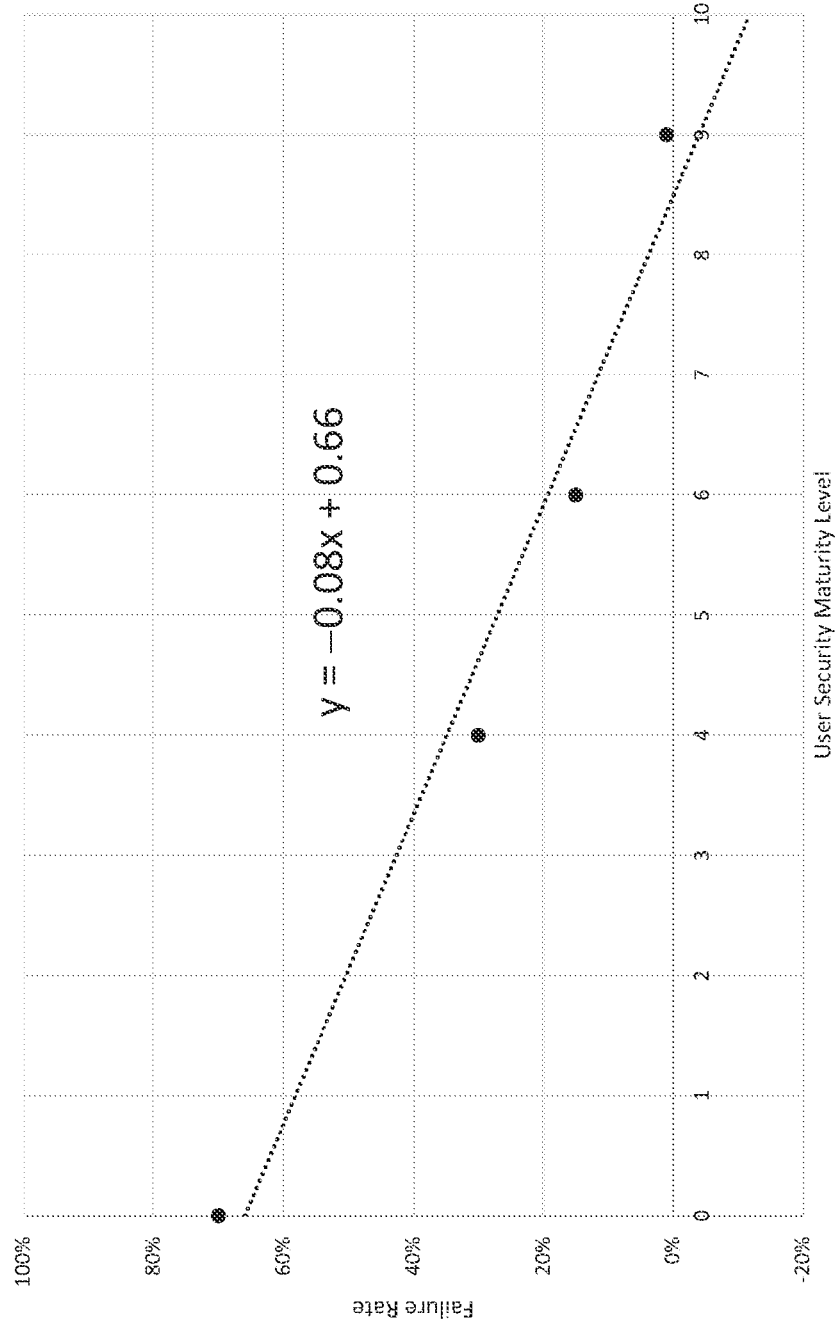
FIG. 4 depicts a graph illustrating a curve of a simulated phishing template failure rate as a function of user security maturity level estimated using linear interpolation, according to one or more embodiments.

In such cases, user response aggregator 232 estimates the template failure rate at user security maturity levels using an algebraic relationship (for example, $y=-0.08x+0.66$) as shown in FIG. 4. FIG. 4 shows a linear extrapolation of incomplete failure rate data which is used for estimating the failure rate for the simulated phishing template at user security maturity levels where there is insufficient data to determine failure rate empirically, according to one or more embodiments. The trendline on FIG. 4 represents the linear extrapolation of the failure rate data that may be used to populate a look-up table for all user security maturity levels from the sparse data. In the example shown in Table 3, only the missing values are filled in using the linear extrapolated values. The original values are shown in the shaded rows of Table 3.

TABLE 3

Incomplete failure rates estimated using linear extrapolation of empirical data for a simulated phishing template as a function of user security maturity level.

| User Security Maturity Level | Failure Rate |
|---|---|
| 0 | 70% |
| 1 | 58% |
| 2 | 50% |
| 3 | 42% |
| 4 | 30% |
| 5 | 26% |
| 6 | 15% |

TABLE 3-continued

Incomplete failure rates estimated using linear extrapolation of empirical data for a simulated phishing template as a function of user security maturity level.

| User Security Maturity Level | Failure Rate |
| --- | --- |
| 7 | 10% |
| 8 | 2% |
| 9 | 1% |
| 10 | −14% |

In some examples, user response aggregator 232 may replace the existing data points with extrapolated data points according to the algebraic relationship as shown in Table 4. For example, a failure rate of the simulated phishing template at user security maturity level 0 is replaced with 66%, which was 70% in Table 2 and Table 3.

TABLE 4

Linear extrapolated failure rates for a simulated phishing template as a function of user security maturity level.

| User Security Maturity Level | Failure Rate |
| --- | --- |
| 0 | 66% |
| 1 | 58% |
| 2 | 50% |
| 3 | 42% |
| 4 | 34% |
| 5 | 26% |
| 6 | 18% |
| 7 | 10% |
| 8 | 2% |
| 9 | −6% |
| 10 | −14% |

Figure 5:
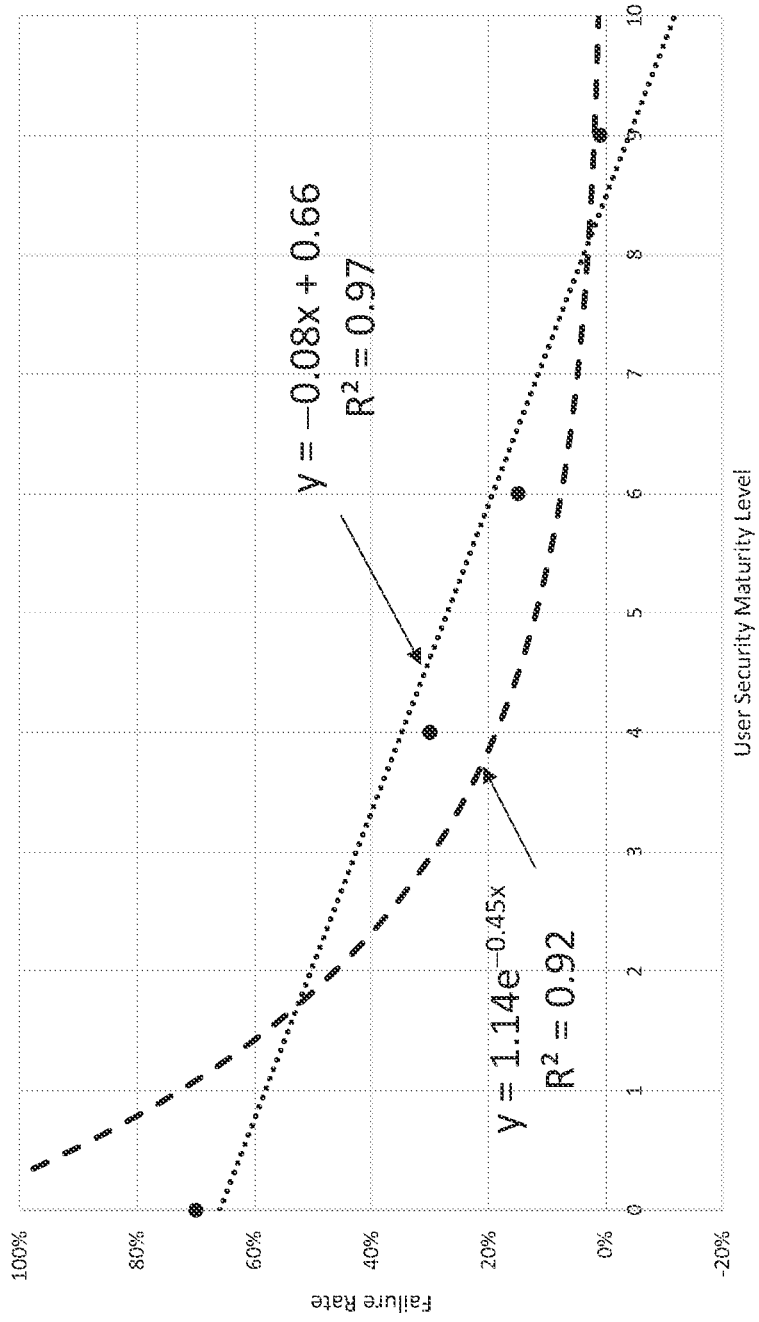
FIG. 5 depicts a graph illustrating curves of a simulated phishing template failure rate as a function of user security maturity level estimated using linear and exponential interpolation, according to one or more embodiments.

In examples, where an extrapolated failure rate for a simulated phishing template for a given user security maturity level is less than a value, the simulated phishing template is not used for users at that user security maturity level. In some examples, user response aggregator 232 may apply other types of algebraic relationships to incomplete data to extrapolate the failure rate data using a trendline, for example, an exponential relationship. In examples, an $R^2$ value of multiple trendlines for different algebraic relationships may be calculated, and the algebraic relationship chosen to be the trendline may be related with the highest $R^2$ value. For example, FIG. 5 shows both an exponential trendline with an $R^2$ value of 0.92 (for $y=1.14e^{-0.45x}$) and a linear trendline with an $R^2$ of 0.97 (for $y=-0.08x+0.66$). As a result, user response aggregator 232 may use linear extrapolation (with $R^2$ of 0.97) to estimate the failure rate for user security maturity levels with insufficient data rather than exponential extrapolation. The extrapolated failure rate estimates for an exponential trendline are shown in Table 5 below.

TABLE 5

Exponential extrapolated failure rates for a simulated phishing template as a function of user security maturity level

| User Security Maturity Level | Failure Rate |
| --- | --- |
| 0 | 70% |
| 1 | 73% |
| 2 | 46% |

TABLE 5-continued

Exponential extrapolated failure rates for a simulated phishing template as a function of user security maturity level

| User Security Maturity Level | Failure Rate |
| --- | --- |
| 3 | 30% |
| 4 | 30% |
| 5 | 12% |
| 6 | 15% |
| 7 | 5% |
| 8 | 3% |
| 9 | 1% |
| 10 | 1% |

In some examples, initially, a simulated phishing template may not have a difficulty level or rating assigned for user security maturity levels. The unclassified simulated phishing template may be used for generating one or more simulated phishing communications. The one or more simulated phishing communications based on the simulated phishing template are communicated to users (using communication unit 230) at a variety of different user security maturity levels as previously described. Many simulated phishing templates may have configurable aspects, which may influence how difficult the simulated phishing template is. In one example, to mitigate the impact of configurable exploits in the simulated phishing template, template configurator 234 may limit the configuration capability of simulated phishing communications based on the simulated phishing template while the difficulty level or rating for the simulated phishing template for one or more user security maturity levels is being established. In some examples, the failure rate of the simulated phishing template for a subset of users that receive the simulated phishing communications based on the simulated phishing template may be adjusted according to how the simulated phishing template is configured for the subset of users. This is described in more detail based on exploit boosting and social engineering adjustments below.

In one or more embodiments, where simulated phishing templates have configurable aspects to them, one aspect that may be configured for simulated phishing communications based on the simulated phishing templates is the number of exploits in the simulated phishing communications. For example, the simulated phishing template may have a URL that can be clicked as the only exploit in the standard version of the simulated phishing template, however template configurator 134 or security awareness system administrator may be able to add other exploits to simulated phishing communications based on the simulated phishing template, such as an attachment with an exploit or a macro. Additional exploits in simulated phishing communications based on the simulated phishing template may make the simulated phishing communications based on the simulated phishing template either more difficult for a user to detect, or less difficult for a user to detect. The incorporation of exploit boosting may enable template difficulty determination unit 226 to estimate the difficulty level or rating for the simulated phishing templates for one or more user security maturity levels where the same simulated phishing template is used but additional exploits are added to simulated phishing communications based on the simulated phishing template that are sent to a subset of users. The situation where additional exploits decreases the difficulty level or rating of the simulated phishing template are described herein, however with no loss of generality this may be adapted to the situation where having additional exploits increases the difficulty level or rating of the simulated phishing template.

The failure rate of a simulated phishing template associated with simulated phishing communications sent to a subset of users may be subject to a failure rate rating "exploit boost" to account for additional exploits that are added to simulated phishing communications based on the standard version of the simulated phishing template. The amount of exploit boosts may be set statically. For example, a standard simulated phishing template may have one exploit, and the failure rate of that simulated phishing template determined based on the performance of that simulated phishing template being sent to a set of users of a user security maturity level is 65%. If the security awareness system administrator adds one exploit to a simulated phishing communications based on that simulated phishing template, then failure rate calculator 240 may decrease the estimated failure rate for the simulated phishing template from the baseline failure rate for the simulated phishing template by the static exploit boost value for the total number of exploits in the revised simulated phishing template. The static exploit boost value is illustrated in Table 5. The static exploit boost may be defined for the maximum number of additional exploits that the standard simulated phishing template can be configured to include.

TABLE 6

Static exploit boost value as a function of the number of exploits in a simulated phishing template for a user security maturity level

| Number of Exploits | Estimated Failure Rate | Static Exploit Boost Value |
|---|---|---|
| 5 | 45% | −20% |
| 4 | 50% | −15% |
| 3 | 55% | −10% |
| 2 | 60% | −5% |
| 1 | 65% | 0% |

In some examples, the impact of additional exploits in a simulated phishing template may be determined by experimentation by gathering the results for simulated phishing communications based on one simulated phishing template sent to a set of users at a fixed user security maturity level (i.e., not at all user security maturity levels). Simulated phishing communications based on the standard simulated phishing template may be sent to a subset of the set of users at the user security maturity level, and the failure rate of that subset of users may be determined through user response aggregator 232. The simulated phishing template may be modified to include one or more additional exploits and simulated phishing communications based on each version of the simulated phishing template sent to a different subset of users at the user security maturity level, and the failure rate for that subset of users may be determined. The impact of the additional exploits for the given simulated phishing template may be determined by considering the failure rates of the different subsets of users at the user security maturity level who received simulated phishing communications based on different variants of the simulated phishing template (all subsets of users have the same user security maturity level). Then template difficulty determination unit 226 may apply the determined "exploit boost" as a function of the number of exploits included in the simulated phishing template to the measured failure rates for the standard simulated phishing template at a user security maturity level to provide a difficulty level or rating for the simulated phishing template for a user security maturity level and each exploit configuration. Once the exploit boost for a simulated phishing template is determined, template configurator 234 may constrain the security awareness system administrator to a maximum number of exploits for the simulated phishing template based on the number of exploits for which an exploit boost level has been determined. Table 7 illustrates exploit boost values expressed as a percentage to be applied to the failure rate of the standard simulated phishing template (resulting in an estimated failure rate of the revised simulated phishing template which may be used to determine the revised simulated phishing template difficulty level or rating).

TABLE 7

Exploit boost value expressed as a percentage of the failure rate of the standard simulated phishing template with one exploit, as a function of the number of exploits in a revised simulated phishing template

| Number of Exploits | Original Failure Rate | Exploit Boost Value |
|---|---|---|
| 5 | 5% | 8% |
| 4 | 13% | 19% |
| 3 | 25% | 38% |
| 2 | 45% | 69% |
| 1 | 65% | 100% |

Figure 6:
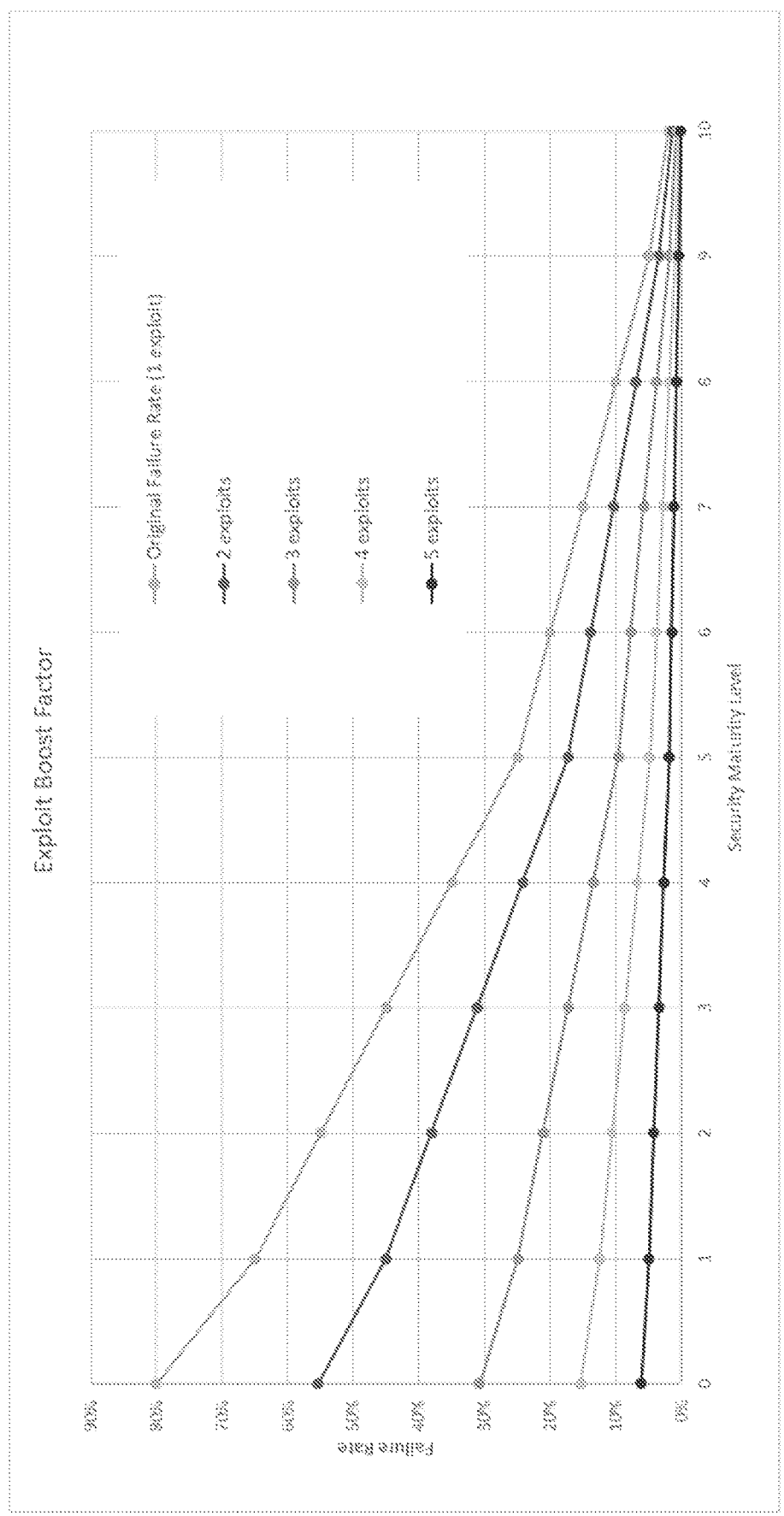
FIG. 6 depicts a graph illustrating estimated failure rates as a function of user security maturity level of a simulated phishing template with different numbers of exploits, derived by applying an exploit boost factor, according to one or more embodiments.

When the exploit boost is applied for each of the user security maturity levels, an exemplary look-up table may be generated as shown below in Table 8, which is also graphically illustrated in FIG. 6.

TABLE 5

Estimated failure rates as a function of user security maturity level and number of exploits in a revised simulated phishing template

| User Security Maturity Level | Original Failure Rate (1 exploit) | 2 exploits | 3 exploits | 4 exploits | 5 exploits |
|---|---|---|---|---|---|
| 0 | 80% | 55% | 31% | 15% | 6% |
| 1 | 65% | 45% | 25% | 13% | 5% |
| 2 | 55% | 38% | 21% | 11% | 4% |
| 3 | 45% | 31% | 17% | 9% | 3% |
| 4 | 35% | 24% | 13% | 7% | 3% |
| 5 | 25% | 17% | 10% | 5% | 2% |
| 6 | 20% | 14% | 8% | 4% | 2% |
| 7 | 15% | 10% | 6% | 3% | 1% |
| 8 | 10% | 7% | 4% | 2% | 1% |
| 9 | 5% | 3% | 2% | 1% | 0% |
| 10 | 2% | 1% | 1% | 0% | 0% |

Where simulated phishing templates have configurable aspects to them, one aspect that may be configured is the number of social engineering indicators in the simulated phishing template. Social engineering indicators are "tells" in the simulated phishing template that the user receiving simulated phishing communications based on the simulated phishing template may recognize as an indication that the message is suspicious. Examples of social engineering indicators include misspelled words, incorrect grammar, and domains that resemble the domain of the indicator sending party but are not exactly the same, for example, service-.paypa.com, google.com, mail.onedrive.com. In some examples, template configurator 234 and/or the security awareness system administrator may be able to add social engineering indicators to the standard simulated phishing template.

Additional social engineering indicators in a simulated phishing template could make the simulated phishing template either more difficult for a user to detect, or less difficult for a user to detect. The incorporation of a social engineering adjustment may enable user response aggregator 232 to compensate the failure rate for a simulated phishing template for users of a user security maturity level in situations where the same simulated phishing template is used but additional social engineering indicators are added to some versions of the simulated phishing template used to generate simulated phishing templates that are sent to a subset of users at the user security maturity level. A situation where the addition of social engineering indicators decreases the difficulty level or rating of the simulated phishing template for users of a user security maturity level are described herein, however with no loss of generality this may be adapted to the situation where the addition of social engineering indicators reduces the difficulty level or rating of the simulated phishing template.

In some examples, the amount of the social engineering indicator adjustment may be set statically. In an example of a static social engineering indicator adjustment, consider the situation where the standard version of a simulated phishing template may have one social engineering indicator, and the security awareness system administrator can add up to an additional four social engineering indicators to the simulated phishing template. One or more simulated phishing communications based on the standard version of the simulated phishing template with one exploit are communicated to a subset of users A (all of which have the same user security maturity level B), resulting in a failure rate of Y, which is used by template difficulty determination unit 226 to establish the difficulty level or rating for the simulated phishing template for users at the user security maturity level. If the simulated phishing template is adapted to include one additional social engineering indicator, then template difficulty determination unit 226 may adjust the difficulty level or rating of the simulated phishing template for the same user security maturity level of the users in subset A downwards, for example, by 5%, denoting that the estimate failure rate for the simulated phishing template with two social engineering indicators sent to a user with a user security maturity level of B may be Y−5%. If the security awareness system administrator adds a second social engineering indicator (making a total of three social engineering indicators in the simulated phishing template), then template difficulty determination unit 226 may estimate the failure rate for the simulated phishing template with three social engineering indicators sent to a user with user security maturity level of B to Y−8%. The static social engineering indicator adjustment may be defined for the maximum number of additional social engineering indicators that the standard simulated phishing template can be configured to include.

In some examples, the impact of additional social engineering indicators on the simulated phishing template difficulty level or rating may be determined by experimentation by gathering the results for one simulated phishing template sent to a set of users at a fixed user security maturity level (i.e., not at all user security maturity levels). One or more simulated phishing communications based on a standard simulated phishing template may be communicated through communication unit 230 to a subset of the set of users. User response aggregator 232 may determine the failure rate of that subset of users. Template configurator 234 may modify the standard simulated phishing template to include one or more additional social engineering indicators, and each version of one or more simulated phishing communications based on the simulated phishing template is communicated to a different subset of users. User response aggregator 232 may determine a failure rate for that subset of users for that version of the simulated phishing template. The impact of the additional social engineering indicators for the given simulated phishing template can then be determined by considering the failure rates of the different subsets of users who received one or more simulated phishing communications based on different variants of the simulated phishing template (all subsets of users have the same user security maturity level). Template difficulty determination unit 226 may apply the determined social engineering indicator adjustment as a function of the number of exploits included in the simulated phishing template to the measured failure rates for the standard version of the simulated phishing template at each of the user security maturity levels to provide a difficulty level or rating for the simulated phishing template for each user security maturity level and each possible number of social engineering indicators. An example of the impact of additional social engineering indicators in terms of social engineering indictor adjustment values to apply to the original failure rate of a template is shown in Table 9.

TABLE 6

Social engineering indicator adjustment value expressed as a percentage of the failure rate of the standard simulated phishing template with one social engineering indicator, as a function of the number of social engineering indicators in a revised simulated phishing template

| Number of Social Engineering Indicators | Original Failure Rate | Social Engineering indicator Adjustment Value |
|---|---|---|
| 5 | 0.0 | 0% |
| 4 | 11.5 | 12% |
| 3 | 25.0 | 26% |
| 2 | 55.0 | 58% |
| 1 | 95.0 | 100% |

Figure 7:
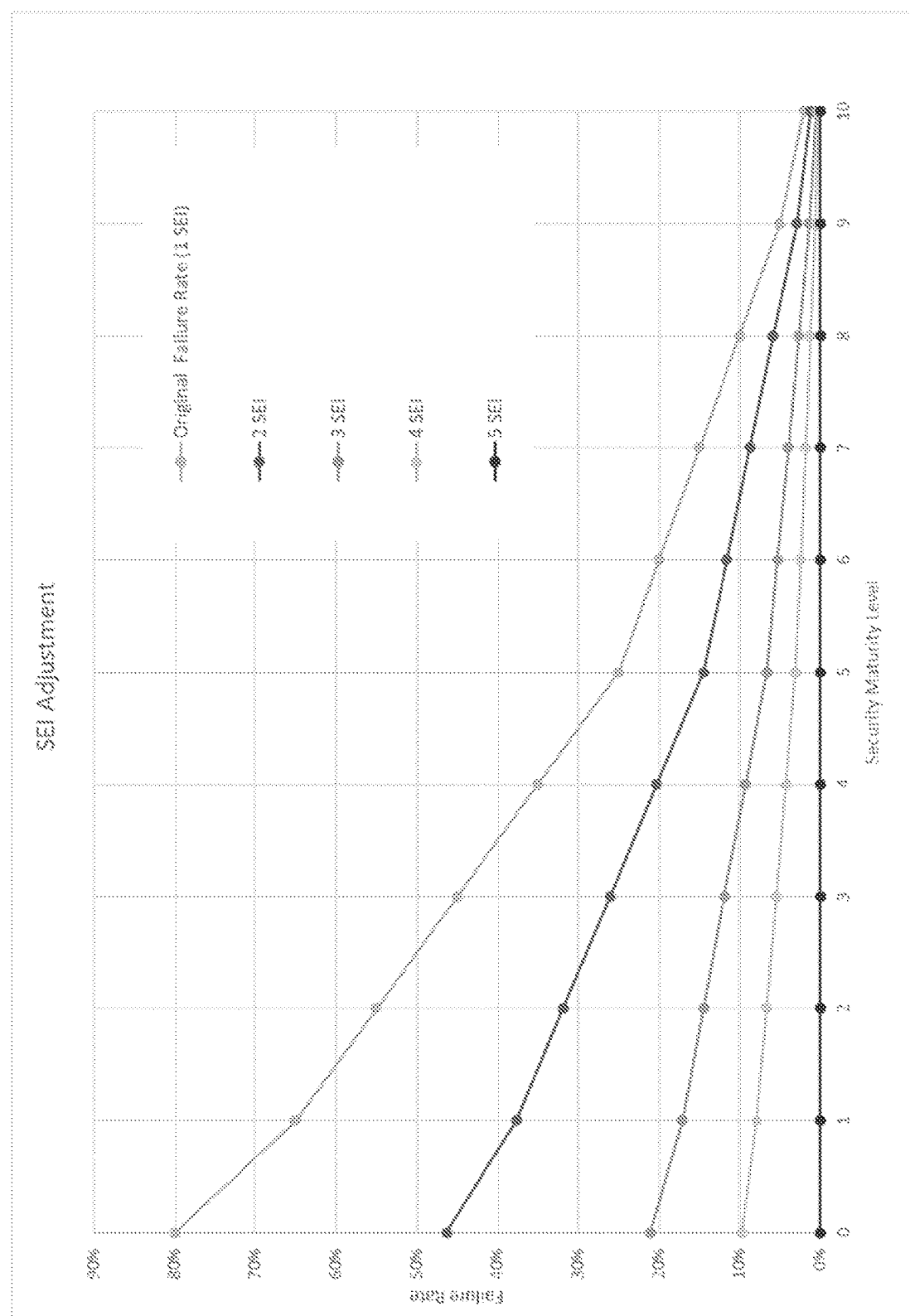
FIG. 7 depicts a graph illustrating estimated failure rates as a function of user security maturity level of a simulated phishing template with different numbers of social engineering indicators, derived by applying a social engineering indicator adjustment, according to one or more embodiments.

When a determined social engineering indicator adjustment as a function of the number of exploits included in the simulated phishing template is applied to the original failure rate of a template at each of the user security maturity levels, an exemplary look-up table may be generated as shown in Table 10, which is also illustrated in FIG. 7.

TABLE 7

Estimated failure rates as a function of user security maturity level and number of social engineering indicators in a revised simulated phishing simulated phishing template

| User Security Maturity Level | Original Failure Rate (1 SEI) | 2 Social Engineering Indicators | 3 Social Engineering Indicators | 4 Social Engineering Indicators | 5 Social Engineering Indicators |
|---|---|---|---|---|---|
| 0 | 80% | 46% | 21% | 10% | 0% |
| 1 | 65% | 38% | 17% | 8% | 0% |
| 2 | 55% | 32% | 14% | 7% | 0% |
| 3 | 45% | 26% | 12% | 5% | 0% |
| 4 | 35% | 20% | 9% | 4% | 0% |
| 5 | 25% | 14% | 7% | 3% | 0% |
| 6 | 20% | 12% | 5% | 2% | 0% |
| 7 | 15% | 9% | 4% | 2% | 0% |
| 8 | 10% | 6% | 3% | 1% | 0% |
| 9 | 5% | 3% | 1% | 1% | 0% |
| 10 | 2% | 1% | 1% | 0% | 0% |

Once the social engineering indicator adjustment value is determined for a simulated phishing template, template configurator 234 may constrain the security awareness system administrator to configuring a maximum number of social engineering indicators in a simulated phishing template so as not to exceed the number of social engineering indicators for which a social engineering indicator adjustment has been determined.

Figure 8:
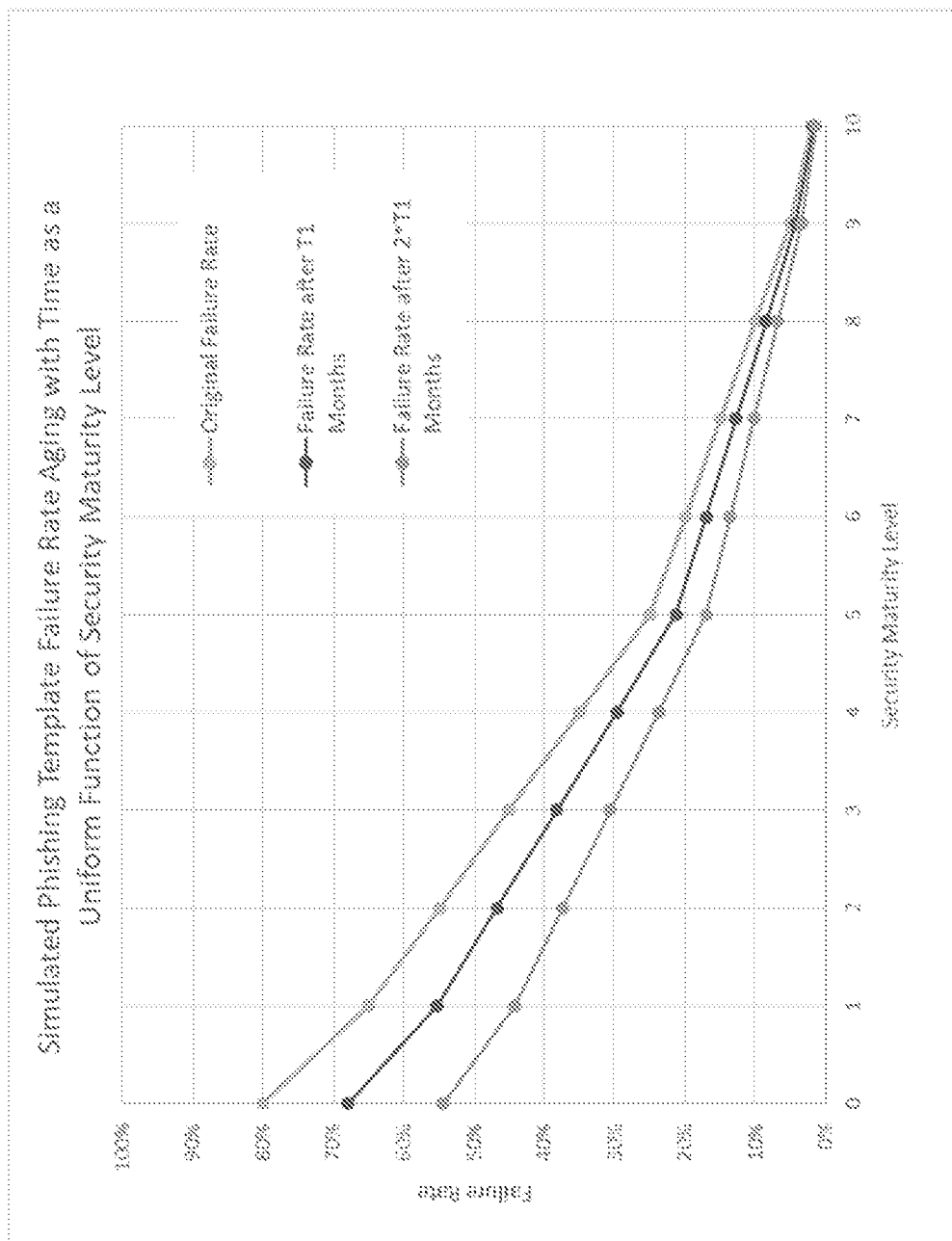
FIG. 8 depicts a graph illustrating aging of simulated phishing template failure rates as a function of user security maturity level applied uniformly across user security maturity levels, according to one or more embodiments.

A difficulty level or rating of a simulated phishing template may decrease over time. For example, the difficulty level or rating of a simulated phishing template may be impacted by how long the simulated phishing template has been in circulation. In some examples, the difficulty level or rating of a simulated phishing template may be a factor of how many times the simulated phishing template has been sent within one organization or within one group within an organization. The gradual decrease of the difficulty level or rating of a simulated phishing template over time or with use may be referred to as template difficulty level aging. In some examples, the failure rate of a simulated phishing template may age uniformly across all user security maturity levels. Template difficulty level aging is illustrated in Table 11, where the failure rate is aged by 15% after T1 months and by an additional 20% after another T1 months. Template difficulty level aging shown in Table 11 is also illustrated in FIG. 8.

TABLE 8

Failure rate aging over time which is uniform across user security maturity levels.

| User Security Maturity Level | Original Failure Rate | Failure Rate after T1 Months | Failure Rate after 2 * T1 Months |
| --- | --- | --- | --- |
| 0 | 80% | 68% | 54% |
| 1 | 65% | 55% | 44% |
| 2 | 55% | 47% | 37% |
| 3 | 45% | 38% | 31% |
| 4 | 35% | 30% | 24% |
| 5 | 25% | 21% | 17% |
| 6 | 20% | 17% | 14% |
| 7 | 15% | 13% | 10% |
| 8 | 10% | 9% | 7% |
| 9 | 5% | 4% | 3% |
| 10 | 2% | 2% | 1% |

Figure 9:
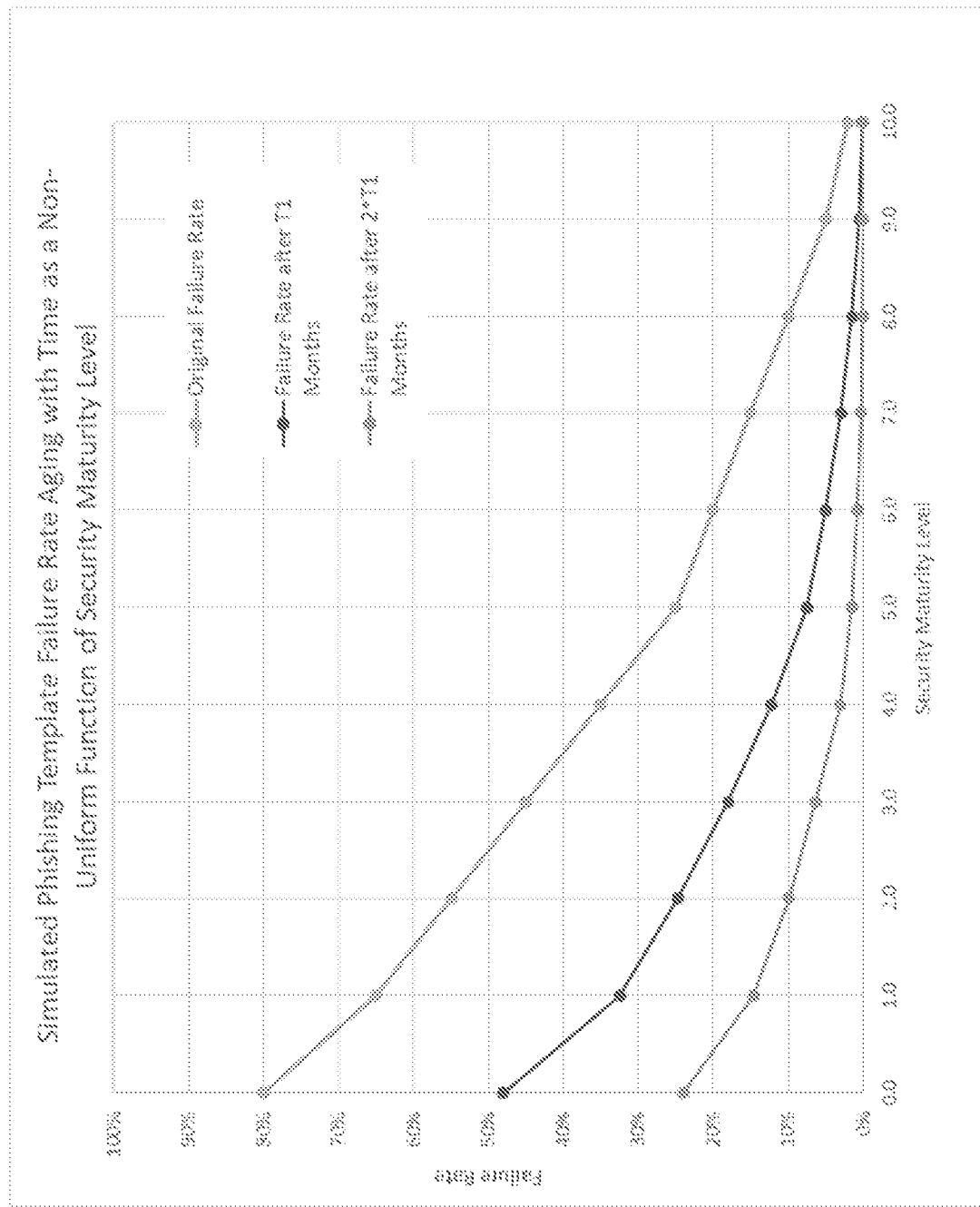
FIG. 9 depicts a graph illustrating aging of simulated phishing template failure rates as a function of user security maturity level applied non-uniformly across user security maturity levels, according to one or more embodiments.

In some examples, the template difficult level aging for different user security maturity levels may not be uniform. For example, a template difficulty level or rating may age faster for users of a more advanced user security maturity level and may age slower or not age at all for users in the lowest user security maturity level. The non-uniform aging across user security maturity levels is illustrated in Table 12. The non-uniform aging across user security maturity levels shown in Table 12 is also graphically illustrated in FIG. 9.

TABLE 12

Failure rate aging over time which is non-uniform across user security maturity levels

| User Security Maturity Level | Aging at T1 months | Aging at 2 * T1 months |
| --- | --- | --- |
| 0 | 60% | 50% |
| 1 | 50% | 45% |
| 2 | 45% | 40% |
| 3 | 40% | 35% |
| 4 | 35% | 25% |
| 5 | 30% | 20% |
| 6 | 25% | 15% |

TABLE 12-continued

Failure rate aging over time which is non-uniform across user security maturity levels

| User Security Maturity Level | Aging at T1 months | Aging at 2 * T1 months |
| --- | --- | --- |
| 7 | 20% | 10% |
| 8 | 15% | 5% |
| 9 | 10% | 0% |
| 10 | 5% | 0% |

In some examples, when a user interacts with a simulated phishing communication based on a simulated phishing template, and that user interaction is included in the failure rate used to determine the template difficulty level or rating, the way in which the user responds to the simulated phishing template may impact the template difficulty level or rating in different ways. Such impact may be referred to as user interaction weighting.

In some examples, the nature of the user interaction (for example, which exploit of a variety of exploits in the simulated phishing template the user interacts with) may be weighed in its contribution to the failure rates used to determine the difficulty level or rating for a simulated phishing template. For example, a "click" on the simulated phishing communication based on the simulated phishing template may add 1 to the failure rate, whereas opening an attachment of the simulated phishing communication may add 1 modified by an exploit weighting factor to the failure rate for the simulated phishing template. In a similar manner, the failure rate of the simulated phishing template may be decreased when a user that received the simulated phishing communication based on the simulated phishing template accurately reported the simulated phishing communication. For example, when a user reports the simulated phishing communication, a negative weighting factor may be assigned to the user interaction "report".

An example of types of user interaction and the weighting values used to influence template failure rate for a simulated phishing template is shown below in Table 13.

TABLE 13

User interaction weights for different user interactions

| Interaction | Weight |
| --- | --- |
| Click | 1.0 |
| Forward | 1.3 |
| Open Attachment | 1.8 |
| Report | −1.3 |

A type of user interaction with a simulated phishing communication based on a simulated phishing communication template has a weighting. The number of the type of user interaction with the simulated phishing template for each user security maturity level is recorded and the failure rate is estimated by applying the user interaction weights using Equation 1 below.

$$R_{aggregate} = R_{click} * W_{click} + R_{forward} * W_{forward} + R_{open} * W_{open} + R_{report} * W_{report} \quad (1)$$

where $R_{click}$, $R_{forward}$, $R_{open}$, and $R_{report}$ refer to click rate, forward rate, open attachment rate, and report rate and $W_{click}$, $W_{forward}$, $W_{open}$, and $W_{report}$ refer to the associated weighing factors of those rates. An example failure rate calculation incorporating user interaction weights for different user interactions is shown in Table 14.

TABLE 14

Failure rate calculation incorporating user interaction weights for different user interactions

| User Security Maturity Level | Click Rate | Forward Rate | Open Attachment Rate | Reported Rate | Failure Rate |
|---|---|---|---|---|---|
| 0 | 25 | 10 | 15 | 0 | 64% |
| 1 | 25 | 8 | 6 | 1 | 45% |
| 2 | 20 | 8 | 4 | 3 | 34% |
| 3 | 18 | 7 | 5 | 4 | 31% |
| 4 | 16 | 6 | 4 | 5 | 24% |
| 5 | 14 | 4 | 4 | 6 | 18% |
| 6 | 10 | 3 | 3 | 6 | 11% |
| 7 | 8 | 2 | 2 | 7 | 5% |
| 8 | 6 | 1 | 0 | 10 | −6% |
| 9 | 5 | 0 | 0 | 15 | −15% |
| 10 | 0 | 0 | 0 | 25 | −33% |

In the methods and systems discussed herein, the difficulty of a simulated phishing template at a user security maturity level may be described in terms of a failure rate, or in terms of a difficulty level or rating. A failure rate of a simulated phishing template is first determined. The failure rate may be converted into a template difficulty level or rating; however this is not a necessary step and the absence of the conversion of a simulated phishing template failure rate into a difficulty level or rating has no impact on the application of the methods and systems described herein. In order to convert the simulated phishing template failure rate for a given user security maturity level to a template difficulty level or rating, which may be for example a numerical value between 0 and 5 (0 being the easiest simulated phishing template and 5 being the hardest simulated phishing template), a normalized set of failure rates may be considered for the given user security maturity level or rating. In some examples, user response aggregator 232 may query calculated failure rates for all eligible simulated phishing templates or groups of simulated phishing templates at a given user security maturity level to return the highest calculated failure rate and return the lowest calculated failure rate. Using these maximum and minimum values, user response aggregator 232 may calculate a normalized failure rate difficulty scale using a difficulty calculation algorithm. An exemplary difficulty calculation algorithm to calculate the difficulty is shown in Equation 2 below.

$$\text{Difficulty} = \left\lceil \left( \frac{r_{aggregated} - r_{aggregated\ min}}{r_{aggregated\ max} - r_{aggregated\ min}} \right) * 5 \right\rceil \quad (2)$$

where $r_{aggregated\ min}$ and $r_{aggregated\ max}$ represent the minimum and maximum failure rates for a simulated phishing template at a given user security maturity level. $\lceil X \rceil$ denotes a standard rounding function.

In some examples, user response aggregator 232 may use a logarithmic normalization to represent a failure rate distribution that exhibits a majority of the calculated failure rates within a nonlinear distribution of failure percentages. In such examples, a difficulty calculation algorithm resembling the one shown in Equation 3 below.

$$\text{Difficulty} = \left\lceil \left( \frac{\log(r_{aggregated}) - \log(r_{aggregated\ min})}{\log(r_{aggregated\ max}) - \log(r_{aggregated\ min})} \right) * 5 \right\rceil \quad (3)$$

where $r_{aggregated\ min}$ and $r_{aggregated\ max}$ represent the minimum and maximum failure rates for a simulated phishing template at a given user security maturity level. $\lceil X \rceil$ denotes the standard rounding function. In some examples, user response aggregator 232 may continuously update these difficulties by updating the returned maximum and minimum failure rates for a given user security maturity level. Such continuous updating may ensure that the difficulty levels or ratings of the simulated phishing templates remain on a 0 to 5 scale.

Figure 10:
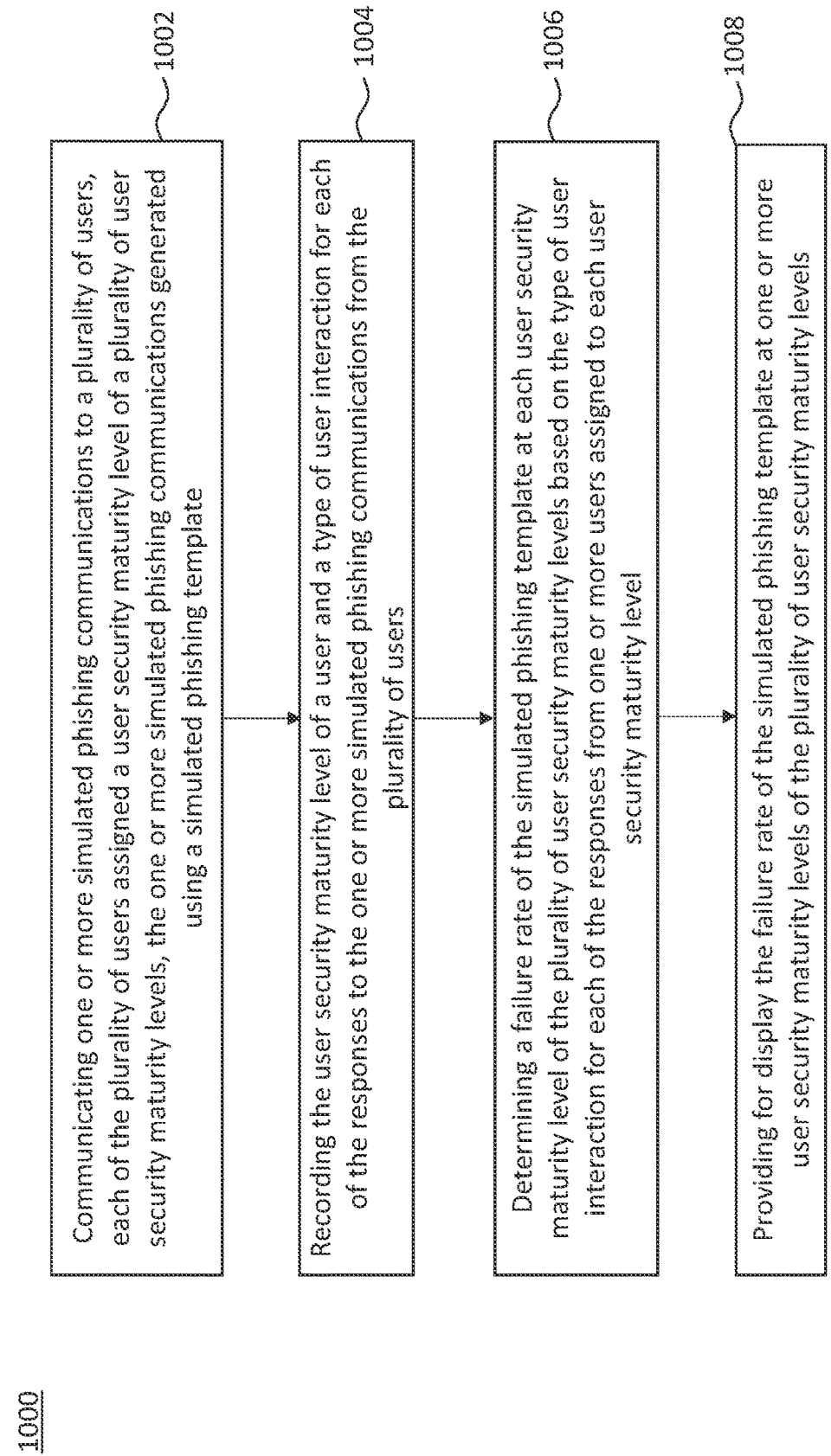
FIG. 10 depicts a flowchart for determining a failure rate of a simulated phishing template as a function of user security maturity level, according to one or more embodiments.

FIG. 10 depicts method 1000 for determining a failure rate of a simulated phishing template, according to one or more embodiments. In the description of the method 1000, the term "failure rate" is used, however "failure rate" or "difficulty level" or "difficulty rating" may be used with no loss in generality.

In a brief overview of an implementation of flowchart 1000, at step 1002, one or more simulated phishing communications may be communicated to a plurality of users. At step 1004, the user security maturity level of a user and a type of user interaction for each of the responses to the one or more simulated phishing communications may be recorded for the plurality of users. At step 1006, a failure rate of the simulated phishing template at each user security maturity level of the plurality of user security maturity levels may be determined based on the type of user interaction for each of the responses from one or more users assigned to each user security maturity level. At step 1008, the failure rate of the simulated phishing template at one or more user security maturity levels of the plurality of user security maturity levels may be provided for display.

Step 1002 includes communicating one or more simulated phishing communications to a plurality of users. In one or more embodiments, the one or more simulated phishing communications is communicated using communication unit 230. The one or more simulated phishing communications as described herein is generated using a simulated phishing template. In examples step 1002 may include communicating the one or more simulated phishing communications to the plurality of users by email, which may be sent over network 270 to user devices 210 (1-N) and received by email clients 262 (1-N). In examples, step 1002 may comprise communicating the one or more simulated phishing communications to a plurality of users by directly injecting the simulated phishing communications into a user inboxes of email clients 262 (1-N). In examples, the one or more simulated phishing communications may be communicated to a plurality of users via text messages, short message service (SMS) messages, instant messaging (IM) messages used by messaging applications such as, e.g. WhatsApp™, or any other type of message.

In one or more embodiments, the simulated phishing template is part of a group of simulated phishing templates. Each of the plurality of users that the simulated phishing communication is sent to may be assigned a user security maturity level of a plurality of user security maturity levels. In one or more embodiments, the plurality of user security maturity levels are represented by one of a range of values or a set of labels. Step 1004 includes recording the user security maturity level of a user and a type of user interaction for each of the responses to the one or more simulated phishing communications from the plurality of users. In one or more embodiments, step 1004 may comprise recording the user security maturity level of a user and a type of user interaction for each of the responses to the one or more simulated phishing communications from the plurality of users. The type of user interaction may include of the following: click, forward, open attachment, report or no interaction. In one or more embodiments, each response may be recorded as a pair of datapoints comprising the user security maturity level of the user and the type of user interaction.

Step 1006 includes determining a failure rate of the simulated phishing template at each user security maturity level of the plurality of user security maturity levels based on the type of user interaction for each of the responses from one or more users assigned to each user security maturity level. In one or more embodiments, failure rate calculator 240 may determine the failure rate of the simulated phishing template. In one or more embodiments, the failure rate of the simulated phishing template may be determined responsive to a least a minimum number of the plurality of users receiving the one or more simulated phishing communications based on the simulated phishing template. In one or more embodiments, the failure rate determined for the simulated phishing template is applied to each simulated phishing template within a group of simulated phishing templates.

Step 1008 includes providing for display the failure rate of the simulated phishing template at one or more user security maturity levels of the plurality of user security maturity levels. In one or more embodiments, a difficulty level or rating of the simulated phishing template may be determined based at least on aggregating the failure rate of the simulated phishing template across the plurality of users that received the one or more simulated phishing communications using the simulated phishing template. In one or more embodiments, template difficulty determination unit 226 may determine the difficulty level or rating of the simulated phishing template. The plurality of users may be from one of a same organization or from multiple organizations. The failure rate may be determined as a function of one or more user security maturity levels of the plurality of user security maturity levels The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method for determining a failure rate of a simulated phishing template, the method comprising:
   communicating, by one or more servers, one or more simulated phishing communications to a plurality of users, each of the plurality of users assigned a user security maturity level of a plurality of user security maturity levels, the one or more simulated phishing communications generated using a simulated phishing template;
   recording, by the one or more servers, a user security maturity level of a user and a type of user interaction for each response of responses to the one or more simulated phishing communications from the plurality of users;
   determining, by the one or more servers, a failure rate of the simulated phishing template at one or more user security maturity levels of the plurality of user security maturity levels based on the type of user interaction for each response of responses from one or more users assigned to the one or more user security maturity levels;
   determining, by the one or more servers, a difficulty level of the simulated phishing template based at least on a number of exploits used by the simulated phishing template and aggregating failure rates of the simulated phishing template across users at a same one or more user security maturity levels of the plurality of user security maturity levels; and
   providing, by the one or more servers, for display the difficulty level and failure rate of the simulated phishing template at one or more user security maturity levels of the plurality of user security maturity levels.

2. The method of claim 1, further comprising determining, by the one or more servers, the difficulty level of the simulated phishing template based at least on the number of exploits and amount of social engineering indicators used by the simulated phishing template.

3. The method of claim 2, wherein the plurality of users are from one of a same organization or from multiple organizations.

4. The method of claim 1, further comprising determining the failure rate as a function of one or more user security maturity levels of the plurality of user security maturity levels.

5. The method of claim 1, wherein the type of user interaction comprises one of the following: click, forward, open attachment, report or no interaction.

6. The method of claim 1, further comprising determining, by the one or more servers, the failure rate of the simulated phishing template responsive to a least a minimum number of the plurality of users responding to the one or more simulated phishing communications.

7. The method of claim 1, further comprising recording, by the one or more servers, each response as a pair of data points comprising the user security maturity level of the user and the type of user interaction.

8. The method of claim 1, wherein the plurality of user security maturity levels are represented by one of a range of values or a set of labels.

9. The method of claim 1, wherein the simulated phishing template is part of a group of simulated phishing templates.

10. The method of claim 9, wherein the failure rate determined for the simulated phishing template is applied to each simulated phishing template within the group of simulated phishing templates.

11. A system for determining a failure rate of a simulated phishing template, the system comprising:
  one or more processors, coupled to memory and configured to:
    communicate one or more simulated phishing communications to a plurality of users, each of the plurality of users assigned a user security maturity level of a plurality of user security maturity levels, the one or more simulated phishing communications generated using a simulated phishing template;
    record a user security maturity level of a user and a type of user interaction for each response of responses to the one or more simulated phishing communications from the plurality of users;
    determine a failure rate of the simulated phishing template at one or more user security maturity levels of the plurality of user security maturity levels based on the type of user interaction for each response of responses from one or more users assigned to the one or more user security maturity levels;
    determine a difficulty level of the simulated phishing template based at least on a number of exploits used by the simulated phishing template and aggregating failure rates of the simulated phishing template across users at a same one or more user security maturity levels of the plurality of user security maturity levels; and
    provide for display difficulty level and the failure rate of the simulated phishing template at one or more user security maturity levels of the plurality of user security maturity levels.

12. The system of claim 11, wherein the one or more processors are further configured to determine the difficulty level of the simulated phishing template based at least on the number of exploits and amount of social engineering indicators used by the simulated phishing template.

13. The system of claim 12, wherein the plurality of users are from one of a same organization or from multiple organizations.

14. The system of claim 11, wherein the one or more processors are further configured to determine the failure rate as a function of one or more user security maturity levels of the plurality of user security maturity levels.

15. The system of claim 11, wherein the type of user interaction comprises one of the following: click, forward, open attachment, report or no interaction.

16. The system of claim 11, wherein the one or more processors are further configured to determine the failure rate of the simulated phishing template responsive to a least a minimum number of the plurality of users responding to the one or more simulated phishing communications.

17. The system of claim 11, wherein the one or more processors are further configured to record each response as a pair of data points comprising the user security maturity level of the user and the type of user interaction.

18. The system of claim 11, wherein the plurality of user security maturity levels are represented by one of a range of values or a set of labels.

19. The system of claim 11, wherein the simulated phishing template is part of a group of simulated phishing templates.

20. The system of claim 19, wherein the failure rate determined for the simulated phishing template is applied to each simulated phishing template within the group of simulated phishing templates.

* * * * *